US009811394B1

(12) United States Patent
Kogias et al.

(10) Patent No.: US 9,811,394 B1
(45) Date of Patent: Nov. 7, 2017

(54) APPLICATION PROGRAMMING INTERFACE RECIPE CLONING

(71) Applicant: Workato, Inc., Cupertino, CA (US)

(72) Inventors: Dimitris Kogias, Seattle, WA (US); Gautham Viswanathan, Saratoga, CA (US); Harish Shetty, Sunnyvale, CA (US); Vijay Tella, Palo Alto, CA (US); Konstantin Tikhonov, Cupertino, CA (US)

(73) Assignee: Workato, Inc., Cupertino, CA (US)

( * ) Notice: Subject to any disclaimer, the term of this patent is extended or adjusted under 35 U.S.C. 154(b) by 0 days.

(21) Appl. No.: 14/882,360

(22) Filed: Oct. 13, 2015

Related U.S. Application Data

(60) Provisional application No. 62/062,952, filed on Oct. 12, 2014.

(51) Int. Cl.
    *G06F 3/00* (2006.01)
    *G06F 9/44* (2006.01)
    *G06F 9/46* (2006.01)
    *G06F 13/00* (2006.01)
    *G06F 9/54* (2006.01)
    *H04L 29/08* (2006.01)

(52) U.S. Cl.
    CPC ............. *G06F 9/541* (2013.01); *H04L 67/10* (2013.01)

(58) Field of Classification Search
    None
    See application file for complete search history.

(56) References Cited

U.S. PATENT DOCUMENTS

| 6,915,287 | B1* | 7/2005 | Felsted | G06F 17/30607 |
| 8,924,661 | B1* | 12/2014 | Shachar | G06F 13/1668 365/189.2 |
| 2012/0203880 | A1* | 8/2012 | Kluyt | G06F 9/54 709/223 |
| 2013/0275044 | A1* | 10/2013 | An | G08G 1/127 701/517 |
| 2015/0370577 | A1* | 12/2015 | Vishwanath | G06F 9/06 718/100 |

FOREIGN PATENT DOCUMENTS

WO    WO 2014007813 A1 *  1/2014  .......... G06F 9/5072

* cited by examiner

*Primary Examiner* — Tuan Dao
*Assistant Examiner* — William C Wood
(74) *Attorney, Agent, or Firm* — Patent Law Works LLP

(57) ABSTRACT

The present disclosure relates to a technology for generating, executing, cloning, and managing application programming interface recipes. A software recipe comprises code including a trigger and one or more executable actions. The system implements a method for cloning software recipes by receiving a software recipe clone request from a user device and responsive to receiving the software clone request, computing requirements of the software recipe. The method involves retrieving input schema and output schema for the trigger and each of the one or more actions. The method involves saving a new instance of the software recipe with updated schema. The method further involves verifying whether the computed requirements are satisfied by the new instance of the software recipe.

19 Claims, 31 Drawing Sheets

APPLICATION PROGRAMMING INTERFACE RECIPE CLONING

CROSS-REFERENCE TO RELATED APPLICATIONS

This application claims the benefit under 35 U.S.C. §119(e) of U.S. Provisional Patent Application No. 62/062, 952, entitled "System and Methods for Using Recipes for an Integration Service and Platform," and filed Oct. 12, 2014, the entire contents of which are incorporated herein by reference.

BACKGROUND

The present disclosure relates to a platform for generating, executing, cloning, and managing application programming interface recipes.

With the onset of the Internet economy, numerous (e.g., hundreds, thousands, etc.) companies have developed online platforms providing all types of different functionalities and services to their end users. These third-party applications range from consumer applications, such as social media, photo sharing, money management, messaging, and entertainment platforms, to business and enterprise software as a service (SaaS) offerings, such as customer relationship management (CRM) platforms, enterprise resource planning (ERP) platforms, workplace collaboration platforms, financial and billing platforms, human resource management platforms, analytics platforms, etc.

A software application can access the computing services offered by these third-party applications using application programming interfaces (APIs) exposed by these platforms. In most cases, the APIs are accessible using standardized access protocols (e.g., SOAP, REST, CORBA, ICE, etc.). These APIs include software methods for accessing the various functionality of the applications, as well as data retrieval methods for accessing information about the APIs, objects, object types, and other aspects of the applications. The APIs generally require users have the requisite permission and authenticate using standard authentication routines (OpenID, OAuth, various proprietary authorization protocols, etc.).

However, integrating (e.g., automate workflow between) these third-party applications (CRM, word processing, storage, versioning, and/or other services) is very complex, time and resource intensive, and ultimately very costly. Moreover, the custom software needed for any such integration is often unreliable due to the constancy of the changes that occur within the third-party applications and/or their APIs. Small to mid-sized business are often unable to bear these integration costs and ultimately lose sales. What is needed is a cost-effective, low-maintenance, active, and powerful third-party application integration platform that addresses the above-noted deficiencies.

SUMMARY

This disclosure describes technology that addresses the above-noted deficiencies of existing solutions by providing discovery tools for locating software recipes that meet connectivity needs, providing recipe curation tools for building software recipes that match specific connectivity requirements, execution tools for activating, running, and evaluating software recipes, and sharing tools for enabling use of the software recipes by a community.

In one innovative aspect, a method for cloning software recipes is disclosed. The method involves receiving a software recipe clone request from a user device of a user to clone a software recipe. The software recipe may comprise code including a trigger and one or more actions executable via one or more network-accessible third-party software applications. Each of the one or more actions is executable using a method accessible via an application programming interface (API) of a corresponding third-party software application. The method further involves computing requirements of the software recipe, responsive to receiving the software clone request, retrieving input schema and output schema for the trigger and each of the one or more actions, and saving a new instance of the software recipe with updated input schema and updated output schema for the trigger and each of the one or more actions relative to a user from which the recipe is being cloned to persistent non-transitory memory in association with a user account of the user using the retrieved input schema and the output schema for the trigger and each of the one or more actions. The method also involves verifying whether the computed requirements are satisfied by the new instance of the software recipe. Verifying whether the computed requirements are satisfied may involve determining an object in the requirements of the software recipe absent from or inconsistent with the updated input schema and the updated output schema of one of the trigger and the one or more actions of the new instance of the software recipe and logging a mapping error in the persistent non-transitory memory responsive to the determination. A user interface may be generated including a notification identifying the mapping error and providing the user interface for presentation. The method may further involve adding one or more missing objects to the updated input schema and the updated output schema.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may in some cases be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIGS. 13A and 13B are graphical representations of a graphical user interface displaying information about an error encountered during the execution of a recipe.

Figure 20:
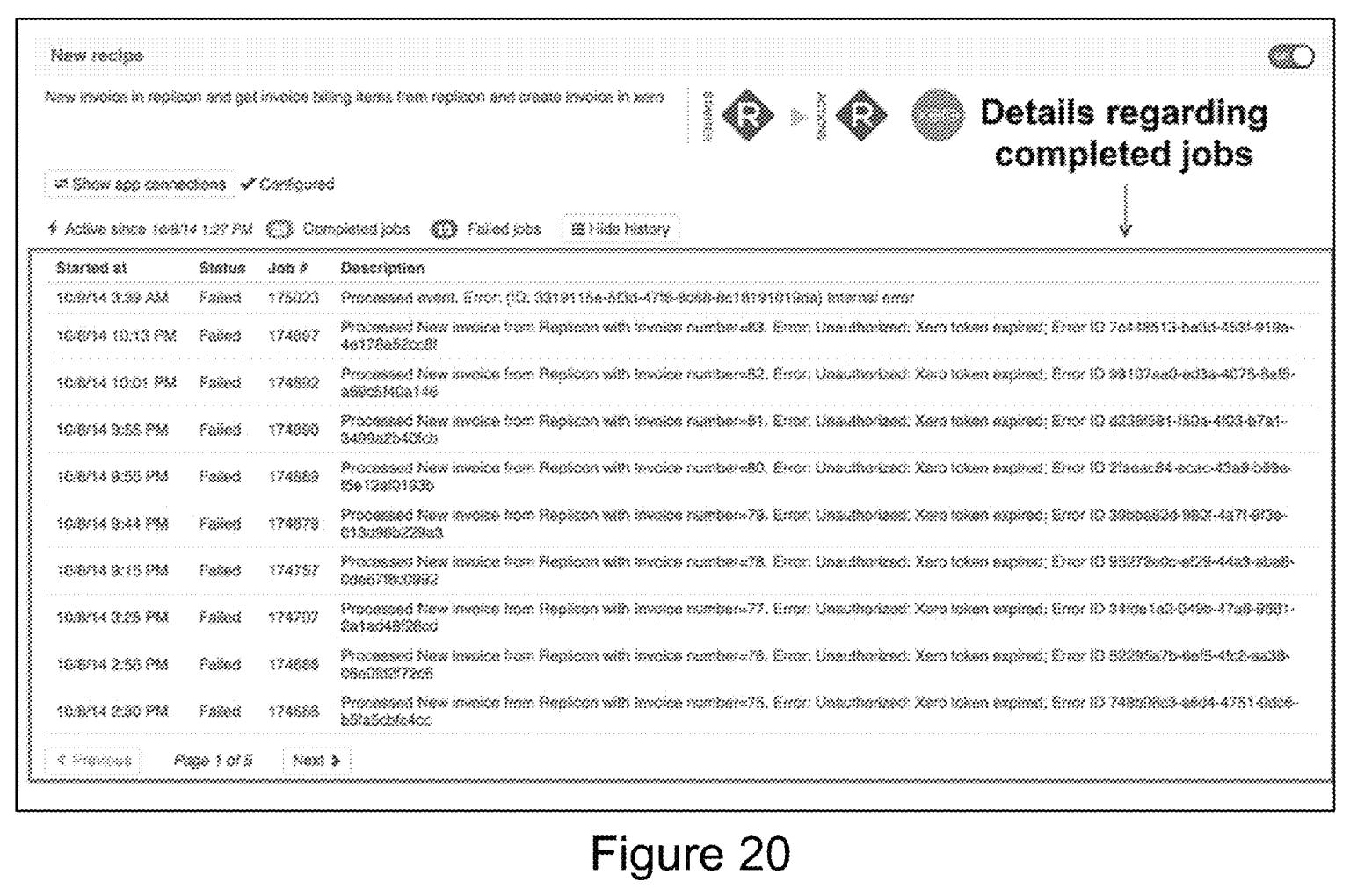

FIG. 20 is a graphical representation of an example interface displaying details regarding completed jobs.

DETAILED DESCRIPTION

The innovative technology disclosed in this application is capable of, for instance, generating, executing, cloning, and managing application programming interface recipes for an integration service. The technology may include various systems, methods, computer program products, interfaces, and other aspects to provide these and other advantages, acts, and/or functionality.

The technology includes a cloud-based service that automates interaction between different applications, e.g. web applications, to facilitate data flow. For the user, the technology greatly simplifies the logic of connecting different applications allowing the user to build integrations with applications using a drag and drop interface. The technology further provides an open community that allows users to collaborate with other users having similar integration needs. For example, the platform specifically allows users to share recipes or collections of recipes with other users. Further novel features include: Declarative schema driven object relationship traversal using web service APIs; schema humanization; inline data mapping recommendations; the ability to bring external app content and functionality within SaaS apps; and embedded app exchange/marketplaces.

Figure 1:
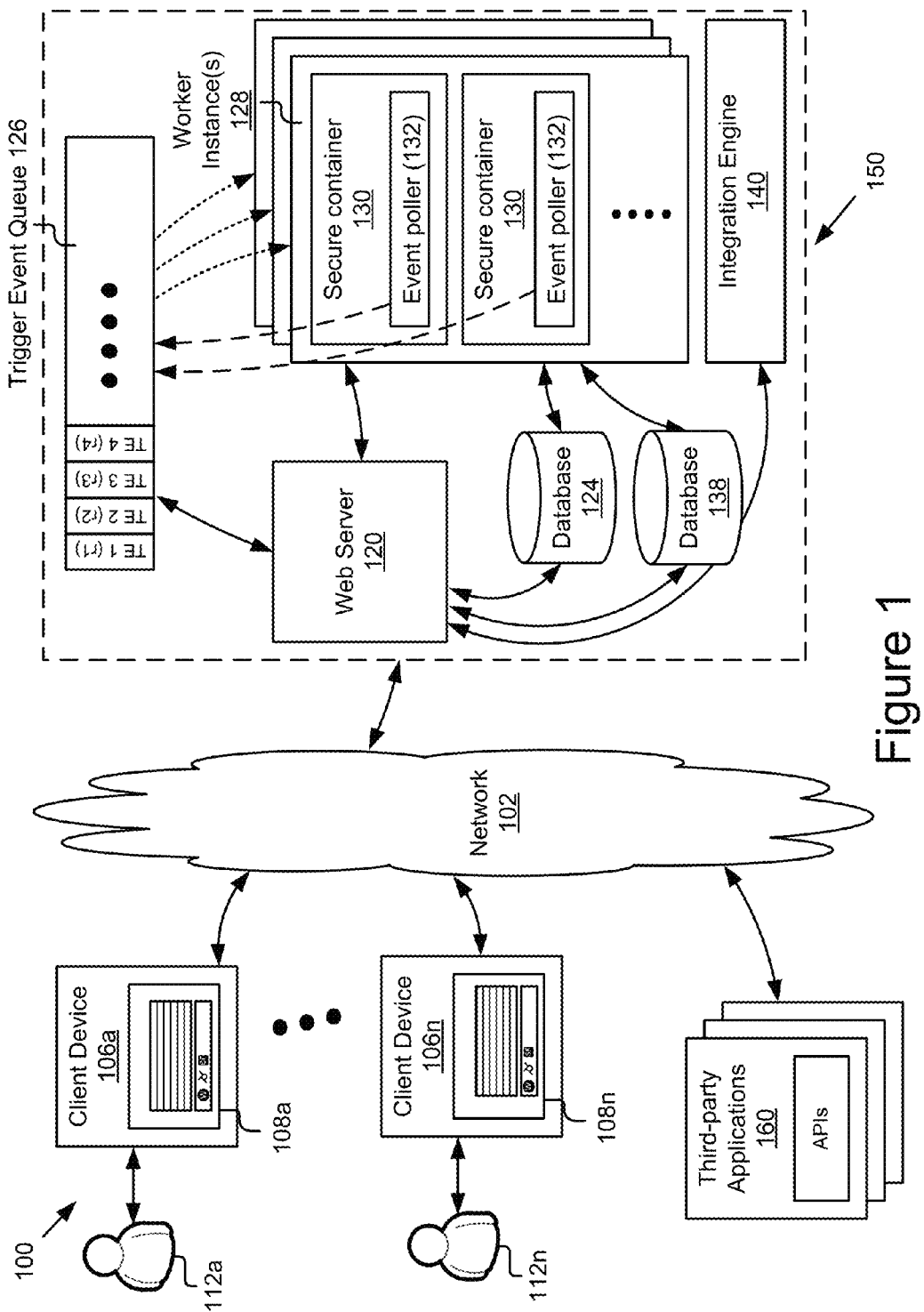
FIG. 1 is a block diagram illustrating an example integration management system encompassed by the technology.

FIG. 1 is a block diagram illustrating an example integration management system 100 encompassed by the technology. The illustrated example system 100 includes client devices 106a . . . 106n, a server system 150, and third-party applications 160, which are communicatively coupled via a network 102 for interaction with one another. For example, the client devices 106a . . . 106n may be respectively coupled to the network 102 and may be accessible by users 112a . . . 112n (also referred to individually and collectively as 112). The server system 150 and third-party applications 160 are also communicatively coupled to the network 102. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless networking software and/or hardware that interconnects the computing devices of the system 100. For example, the network 102 may include packet-switching devices that route the data packets to the various computing devices based on information included in a header of the data packets.

The client devices 106a . . . 106n (also referred to individually and collectively as 106) include computing systems having data processing and communication capabilities. In some implementations, a client device 106 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, and/or various physical connection interfaces (e.g., USB, HDMI, etc.), etc. The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing systems.

In the depicted implementation, the client devices 106a . . . 106n respectively contain instances 108a . . . 108n of a client application (also referred to individually and collectively as 108). The client application 108 may be storable in a memory (e.g., see FIG. 2) and executable by a processor (e.g., see FIG. 2) of a client device 106 to provide for user interaction, receive user input, present information to the user via a display (e.g., see FIG. 2), and send data to and receive data from the other entities of the system 100 via the network 102. Examples of various interfaces that can be rendered and presented by the client application 108 are depicted in FIGS. 3-7 and 12A-15.

In some implementations, the client application 108 may generate and present various user interfaces to perform these acts and/or functionality, such as the example graphical user interfaces discussed elsewhere herein, which may in some cases be based at least in part on information received from local storage, the server system 150, and/or one or more of the third-party applications 160 via the network 102. In some implementations, the client application 108 is code operable in a web browser, a native application (e.g., mobile app), a combination of both, etc. Additional structure, acts, and/or functionality of the client devices 106 and the client application 108 are described in further detail elsewhere in this document.

The server system 150 and/or the third-party applications 160 may include one or more computing systems having data processing, storing, and communication capabilities. For example, these entities 150 and/or 160 may include one or more hardware servers, virtual servers, server arrays, storage devices and/or systems, etc., and/or may be centralized or distributed/cloud-based. In some implementations, these entities 150 and/or 160 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the server system 150 includes a web server 120, a trigger event queue 126, databases 124 and 138, worker instances 128, and an integration engine 140. These components, and their sub-components, are coupled for electronic communication with one another, and/or the other elements of the system 100. In some instances, these components may communicate via direct electronic connections or via a public and and/or private computer network, such as the network 102.

In some embodiments, a worker instance 128 represents a worker compute node and may include more than one secure container 130, as shown in FIG. 1. Each container in the worker instance 128, at a given time, runs a recipe. A container may add trigger events to the trigger event queue 126 and (responsive to the trigger event being triggered) receive events from the trigger event queue 126. The event poller 132 is software configured to poll for messages indicating the completion of a prior call so the secure container can proceed to the next step of the recipe (or to completion as the case may be). The server system 150 may utilize any suitable runtime environment and process queue/worker architecture, such as Heroku™.

The web server 120 includes computer logic executable by the processor 204 (see FIG. 2) to process content requests. The web server 120 may include an HTTP server, a REST (representational state transfer) service, or other suitable server type. The web server 120 may receive content requests (e.g., product search requests, HTTP requests) from client devices 106, cooperate with the other components of the server system 150 (e.g., integration engine 140, worker instances 128, trigger event queue 126, etc.) to determine the content and or trigger processing, retrieve and incorporate data from the databases 124 and 138, format the content, and provide the content to the client devices 106. In some instances, the web server 120 may format the content using a web language and provide the content to a corresponding client application 108 for processing and/or rendering to the user for display. The web server 120 may be coupled to the databases 124 and 138 to store retrieve, and/or manipulate data stored therein.

In some embodiments, the components 108, 120, 128, 126, and/or 140 may include computer logic storable in the memory 206 and executable by the processor 204, and/or implemented in hardware (e.g., ASIC, FPGA, ASSP, SoC, etc.), to provide their acts and/or functionality. For example, with reference also to FIG. 2, in some embodiments, the client application 108, the web server 120, the worker instances 128, the trigger event queue 126, and/or the integration engine 140, and/or their sub-modules are sets of instructions executable by the processor 202 to provide their functionality. In some embodiments, these components and/or their sub-components are stored in the memory 204 of the computing system 200 and are accessible and executable by the processor 202 to provide their functionality. In any of the foregoing embodiments, these components and/or their sub-components may be adapted for cooperation and communication with the processor 202 and other components of the computing system 200.

The databases 124 and 138 are information sources for storing and providing access to data. Examples of the types of data stored by the databases 124 and 128 may include user and partner account information, codes representing the recipes, requirement tables associated with the codes, input and output schemas associated with the codes and/or applications, objects associated with the applications, codes, and/or schemas, etc., and/or any of the other data discussed herein that is received, processed, stored, or provided by the integration management system 100. Recipes may be associated with a user's account.

The databases 124 and 138 may be included in the computing system 200 or in another computing system and/or storage system distinct from but coupled to or accessible by the computing system 200. The databases 124 and 138 can include one or more non-transitory computer-readable mediums for storing the data. In some implementations, the databases 124 and 138 may be incorporated with the memory 204 or may be distinct therefrom. In some implementations, the databases 124 and 138 may include a database management system (DBMS) operable on the computing system 200. For example, the DBMS could include a structured query language (SQL) DBMS, a NoSQL DBMS, various combinations thereof, etc. In some instances, the DBMS may store data in multi-dimensional tables comprised of rows and columns, and manipulate, i.e., insert, query, update and/or delete, rows of data using programmatic operations.

The third-party applications 160a . . . 160n, as depicted, respectively expose APIs 162 for accessing the functionality and data of the third-party applications 160a . . . 160n (also referred to individually and collectively as 160). An application 160 may include hardware (e.g., a server) configured to execute software, logic, and/or routines to provide various services (consumer, business, etc.), such as video, music and multimedia hosting, distribution, and sharing; email; social networking; blogging; micro-blogging; photo management; cloud-based data storage and sharing; ERM; CRM; financial services; surveys; marketing; analytics; a combination of one or more of the foregoing services; or any other service where users store, retrieve, collaborate, generate, consume, and/or share information.

In some implementations, the client application 108, the various components of the server system 150, the third-party applications 160, etc., may require users 112 to be registered to access the acts and/or functionality provided by them. For example, to access various acts and/or functionality provided by these components, the components may require a user 112 to authenticate his/her identity (e.g., by confirming a valid electronic address or other information). In some instances, these entities 108, 120, 140, 160, etc., may interact with a federated identity server (not shown) to register/authenticate users 112. Once registered, these entities may require a user 112 seeking access to authenticate by inputting credentials in an associated user interface.

The system 100 illustrated in FIG. 1 is representative of an example system for collaborative design, and it should be understood that a variety of different system environments and configurations are contemplated and are within the scope of the present disclosure. For instance, various functionality may be moved from a server to a client, or vice versa and some implementations may include additional or fewer computing systems, services, and/or networks, and may implement various functionality client or server-side. Further, various entities of the system 100 may be integrated into to a single computing device or system or additional computing devices or systems, etc.

Additional acts, structure, and/or functionality of at least the client devices 106, the server system 150, the third-party applications 160, and their constituent components are described in further detail below.

Figure 2:
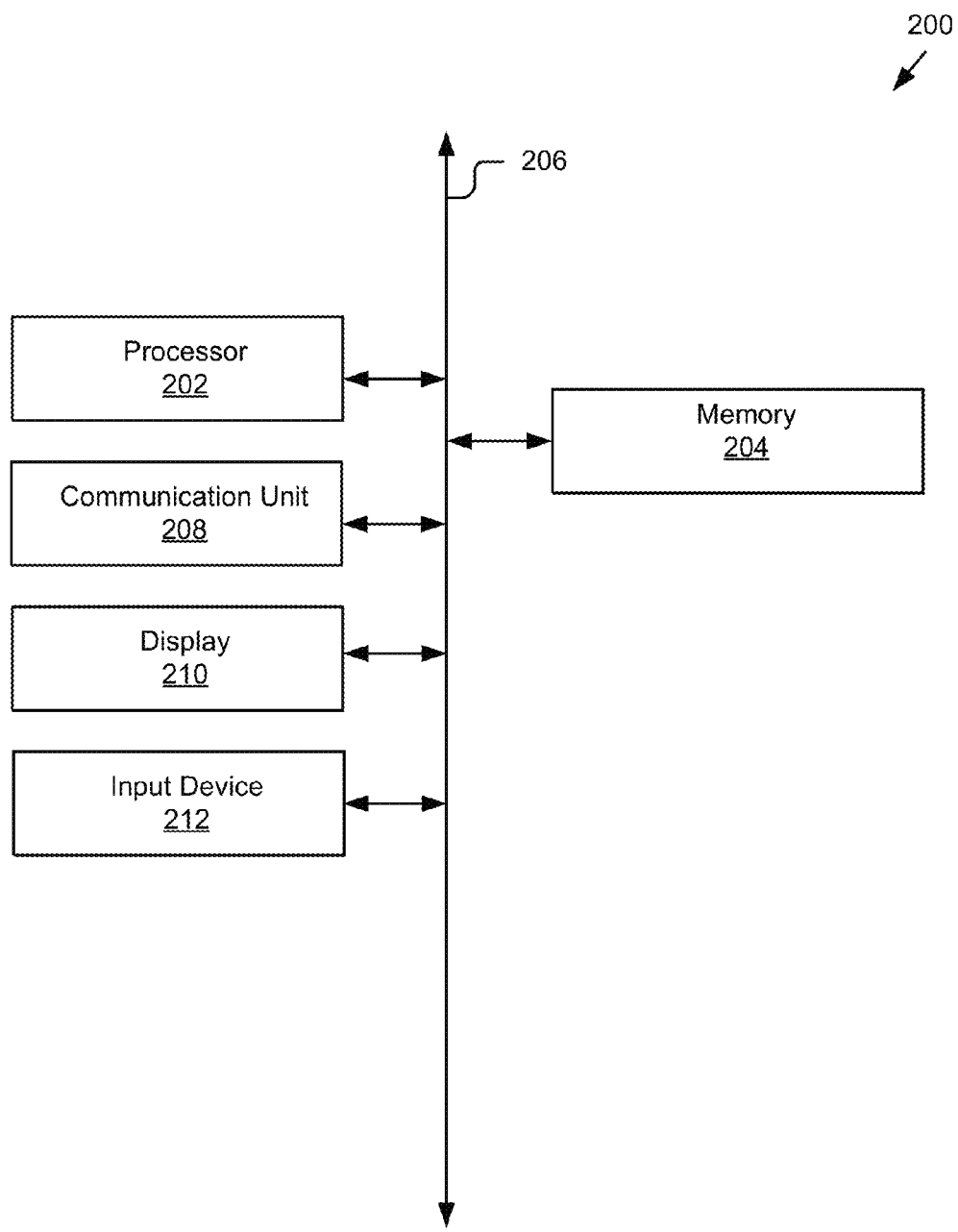
FIG. 2 is a block diagram of an example computing system.

FIG. 2 is a block diagram of an example computing system 200. The example computing system 200 may represent the computer architecture of a client device 106, a server system 150, and/or a server of the third-party application 160, depending on the implementation. As depicted, the computing system 200 may include a processor 202, a memory 204, a communication unit 208, a display 210, and an input device 212, which may be communicatively coupled by a communications bus 206. The computing system 200 depicted in FIG. 2 is provided by way of example and it should be understood that it may take other forms and include additional or fewer components without departing from the scope of the present disclosure. For instance, various components of the computing devices and may be coupled for communication using a variety of communication protocols and/or technologies including, for instance, communication buses, software communication mechanisms, computer networks, etc.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device, supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing system 200 including, for example, the memory 204, the communication unit 208, display 210, and the input device 212.

The memory 204 may store and provide access to data to the other components of the computing system 200. The memory 204 may be included in a single computing device or a plurality of computing devices as discussed elsewhere herein. In some implementations, the memory 204 may store instructions and/or data that may be executed by the processor 202. For example, the memory 204 may include various different combinations of the software components described herein, depending on the configuration. The memory 204 is also capable of storing other instructions and data, including, for example, an operating system, hardware drivers, other software applications, databases, etc. The memory 204 may be coupled to the bus 206 for communication with the processor 202 and the various other components of computing system 200.

The memory 204 includes a non-transitory computer-usable (e.g., readable, writeable, etc.) medium, which can be any tangible apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing system or between computing systems, a network bus system including the network 102 and/or portions thereof, a processor mesh, a combination thereof, etc. In some implementations, the various components of the system 100 may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102 and/or other computing systems. For instance, the communication unit 208 may include, but is not limited to, CAT-type interfaces; wireless transceivers for sending and receiving signals using Wi-Fi™, Bluetooth®, IrDA™, Z-Wave™, ZigBee®, cellular communications, and the like, etc.; USB interfaces; various combinations thereof; etc. The communication unit 208 may connect to and send/receive data via a mobile network, a public IP network of the network 102, a private IP network of the network 102 etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The display 210 may display electronic images and data output by the computing system 200 for presentation to a user 112. The display 210 may include any conventional display device, monitor or screen, including, for example, an organic light-emitting diode (OLED) display, a liquid crystal display (LCD), etc. In some implementations, the display 210 may be a touch-screen display capable of receiving input from one or more fingers of a user 112. For example, the display 210 may be a capacitive touch-screen display capable of detecting and interpreting multiple points of contact with the display surface. In some implementations, the computing system 200 may include a graphics adapter (not shown) for rendering and outputting the images and data for presentation on display 210. The graphics adapter (not shown) may be a separate processing device including a separate processor and memory (not shown) or may be integrated with the processor 202 and memory 204.

The input device 212 may include any device for inputting information into the computing system 200. In some implementations, the input device 212 may include one or more peripheral devices. For example, the input device 212 may include a keyboard (e.g., a QWERTY keyboard), a pointing device (e.g., a mouse or touchpad), microphone, an image/video capture device (e.g., camera), etc. In some implementations, the input device 212 may include a touch-screen display capable of receiving input from the one or more fingers of the user. For instance, the structure and/or functionality of the input device 212 and the display 210 may be integrated, and a user of the computing system 200 may interact with the computing system 200 by contacting a surface of the display 210 using one or more fingers. In this example, the user could interact with an emulated (i.e., virtual or soft) keyboard displayed on the touch-screen display 210 by using fingers to contact the display in the keyboard regions.

A recipe is an integration flow that contains a trigger and a set of actions. The trigger causes the actions in a recipe to be executed. Actions are the routines the recipe runs. Each action includes an input configuration and is associated with a given application. Each trigger and action further includes and input schema and an output schema. Actions may run in parallel, series, or various combinations thereof. In some instances, one action may be dependent upon the output of a preceding action. In a typical recipe configuration, the different actions in the recipe are associated with different applications, and the recipe automates the interaction between the different applications using the application programming interfaces (APIs) of those applications. For instance, the recipe may flow, sync, etc., data from one application to another, populate multiple different applications with data from a certain source application, etc. In some embodiments, the recipes (codes 132) are written in Ruby, and the secure containers 130 of the worker instances 128 interpret and process the codes 132, although it should be understood that other languages and interpreters may be used.

Figure 12A:
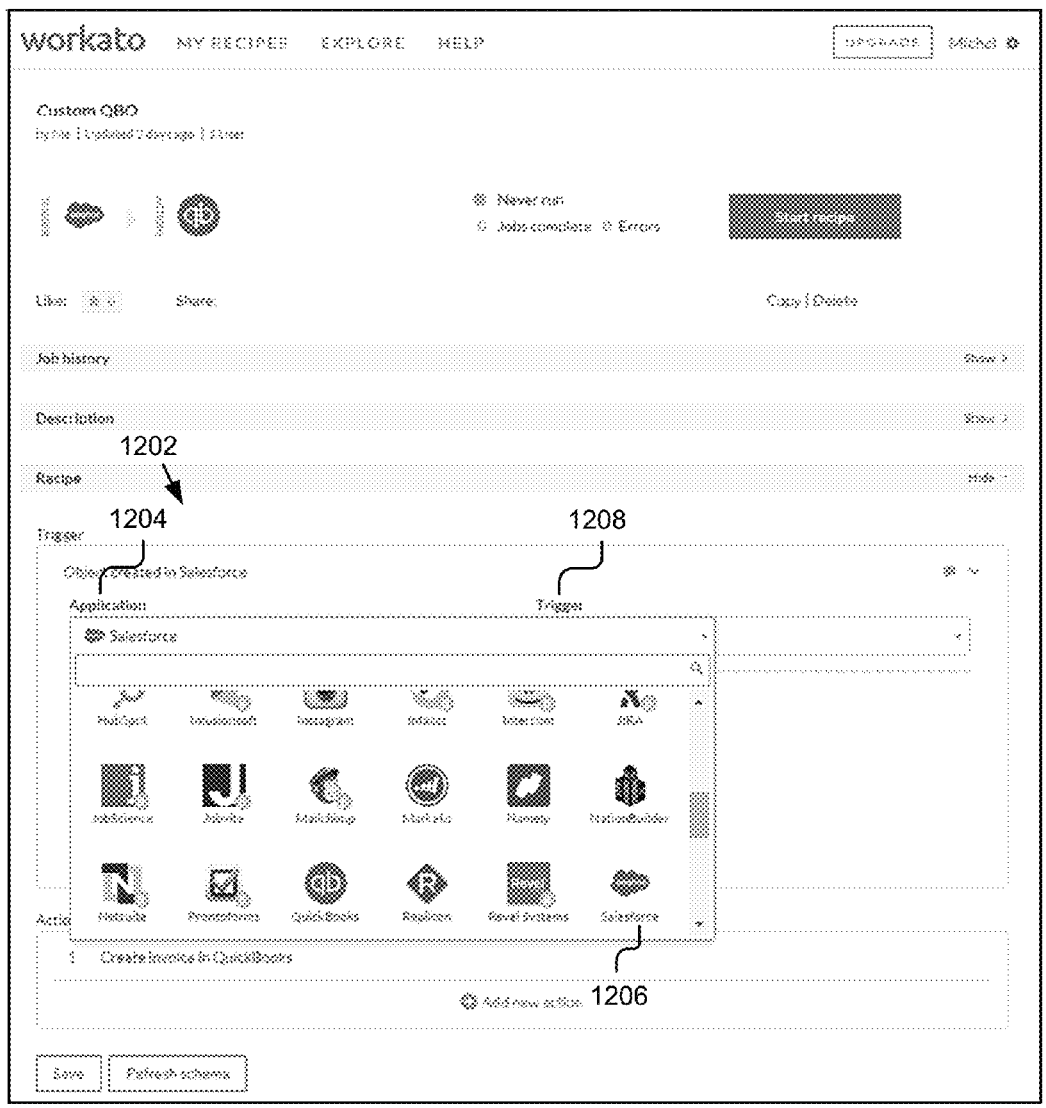
FIGS. 12A-12E are graphical representations of a graphical user interface including elements for defining an example software recipe including a trigger and a set of actions.
Figure 12B:
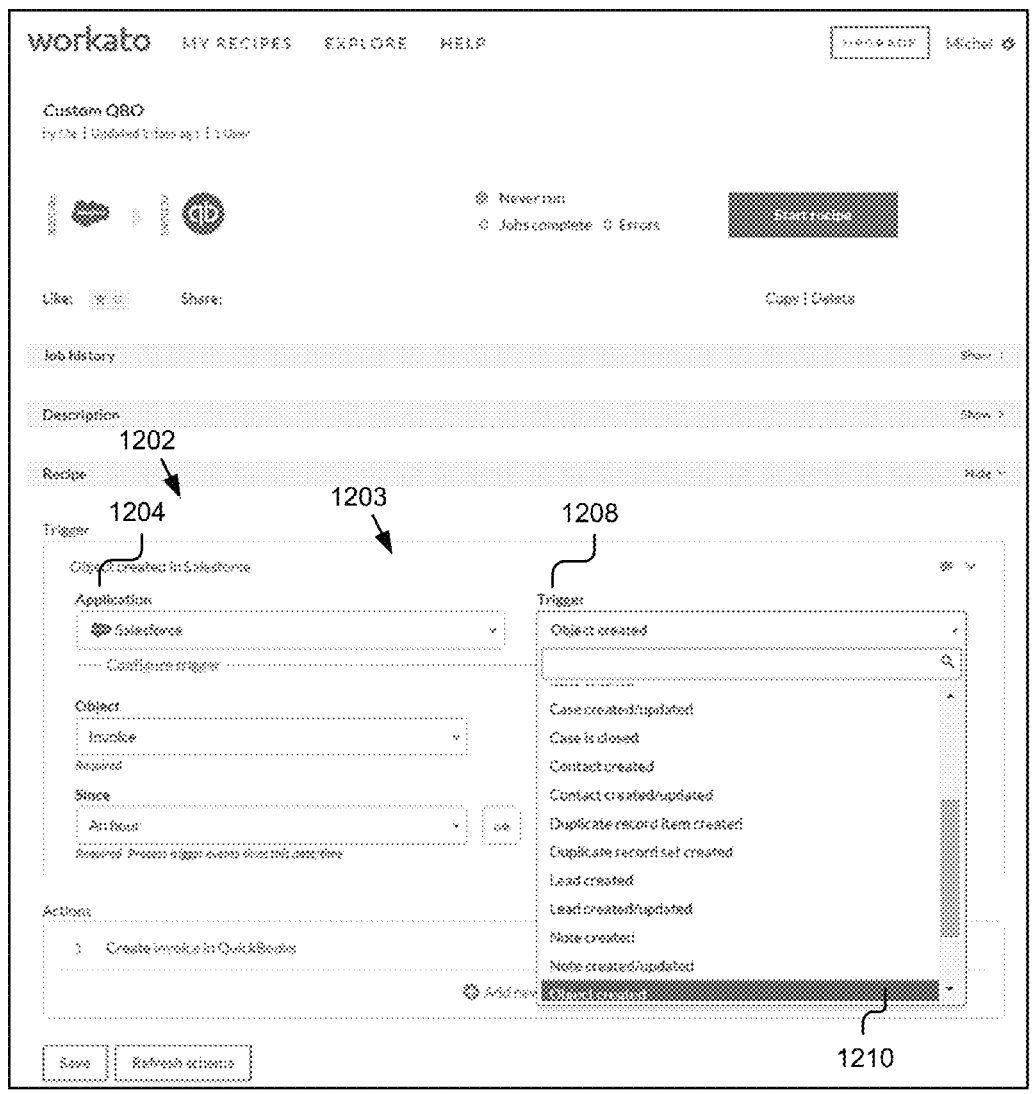

FIGS. 12A-12E are graphical representations of a graphical user interface 1200 including elements for defining an example software recipe including a trigger and a set of actions. In FIG. 12A, the interface 1200 includes a recipe region 1202. The recipe region 1202 includes a trigger section 1203 for configuring the parameters of the trigger. Specifically, the trigger section 1203 includes an application definition element 1204 and a trigger definition element 1208. The application definition element 1204 is user selectable to define which application activates the trigger. In the depicted embodiment, the application definition element 1204 is a drop-down menu that is populated with numerous web applications user may select from, although it should be understood that other suitable UI elements may be utilized. For instance, the user selects the Salesforce™ web application 1206 using the application definition element 1204.

Upon defining the application using the application definition element 1204, the trigger action is then defined using the trigger definition element 1208. The trigger action may be any event that can occur within the application defined using the application definition element 1204. For example, any event that may occur within the Salesforce™ application 1206, whether user-driven or timer-driven, may be utilized. In the depicted embodiment, the trigger definition element 1208 is a drop-down menu that is populated with the known events that exist within the defined application. For instance, the trigger action may be that an object was created within the Salesforce™ application.

Figure 12C:
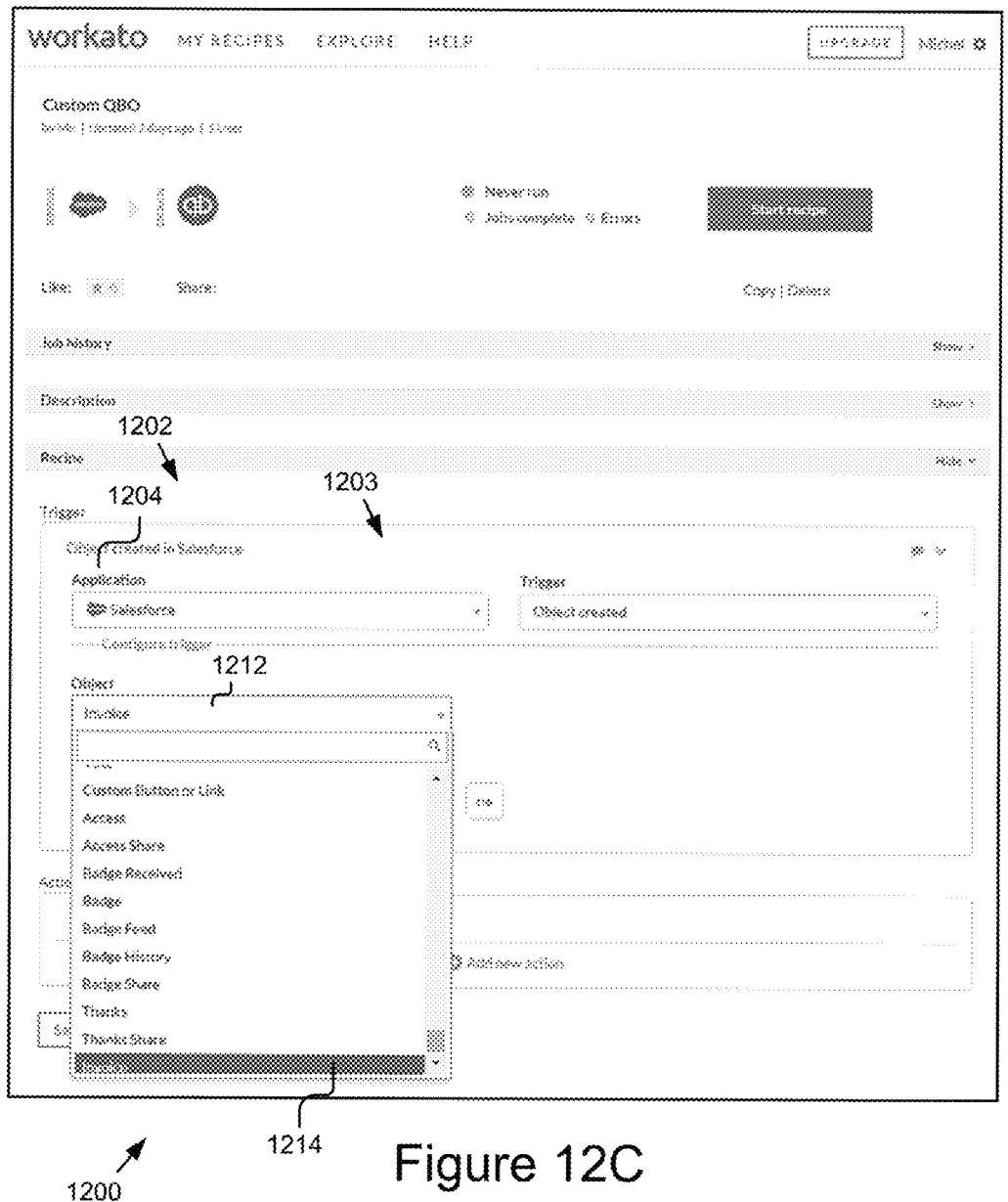
Figure 12D:
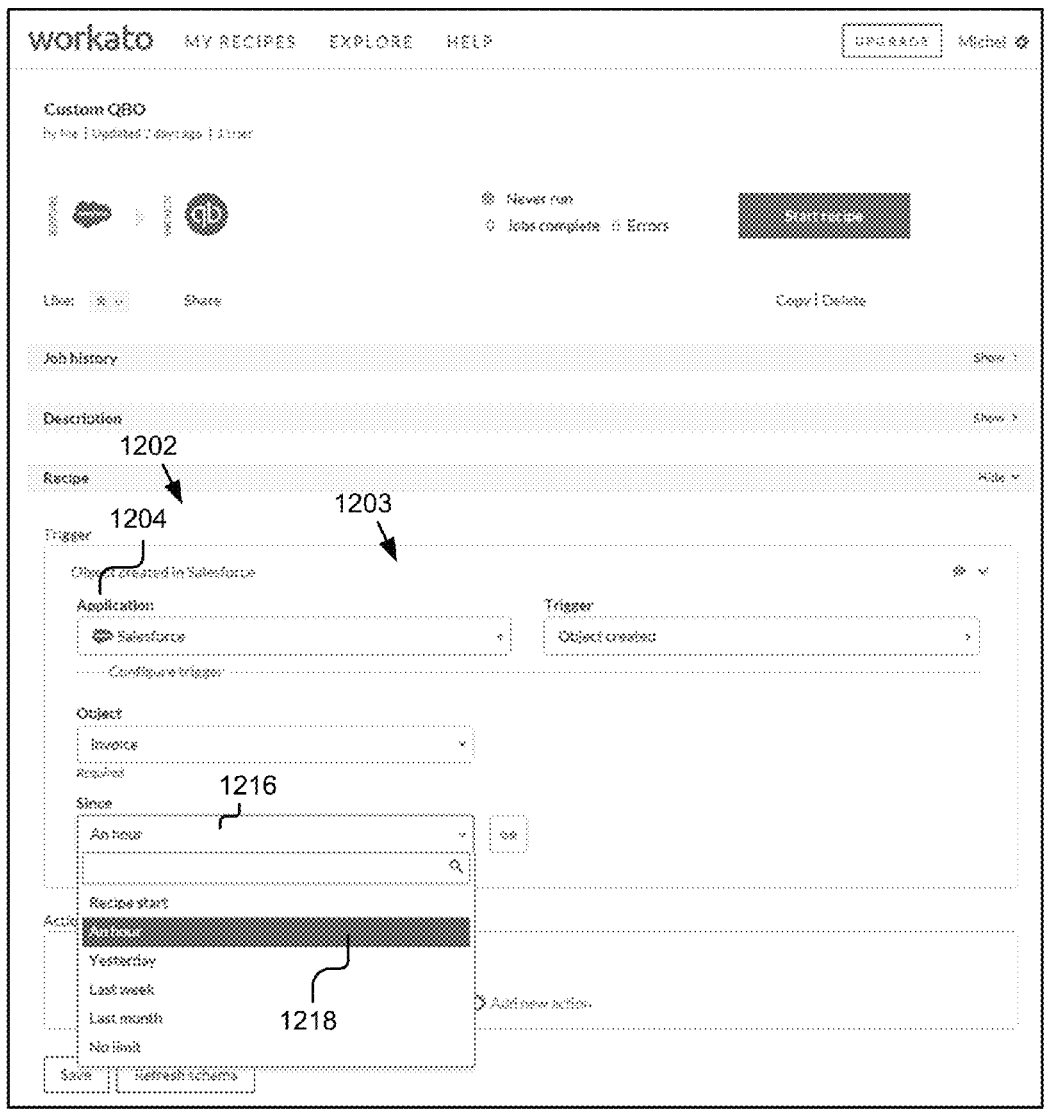

Once the trigger action is defined, further parameters characterizing the trigger action may need to be defined and corresponding fields for defining those parameters and be included in the trigger section 1203 as depicted in FIGS. 12C and 12D. For example, using the drop-down menu 1212, the user may select invoice 1214 as the created object 1210 and may select a specific time (e.g., an hour) 1218 using the drop-down menu 1216. The elements in the drop-down menus 1212 and 1216 may be retrievable from the application 1204 using a corresponding API or a data store storing data previously retrieved from the application 1204 using the corresponding API.

Figure 12E:
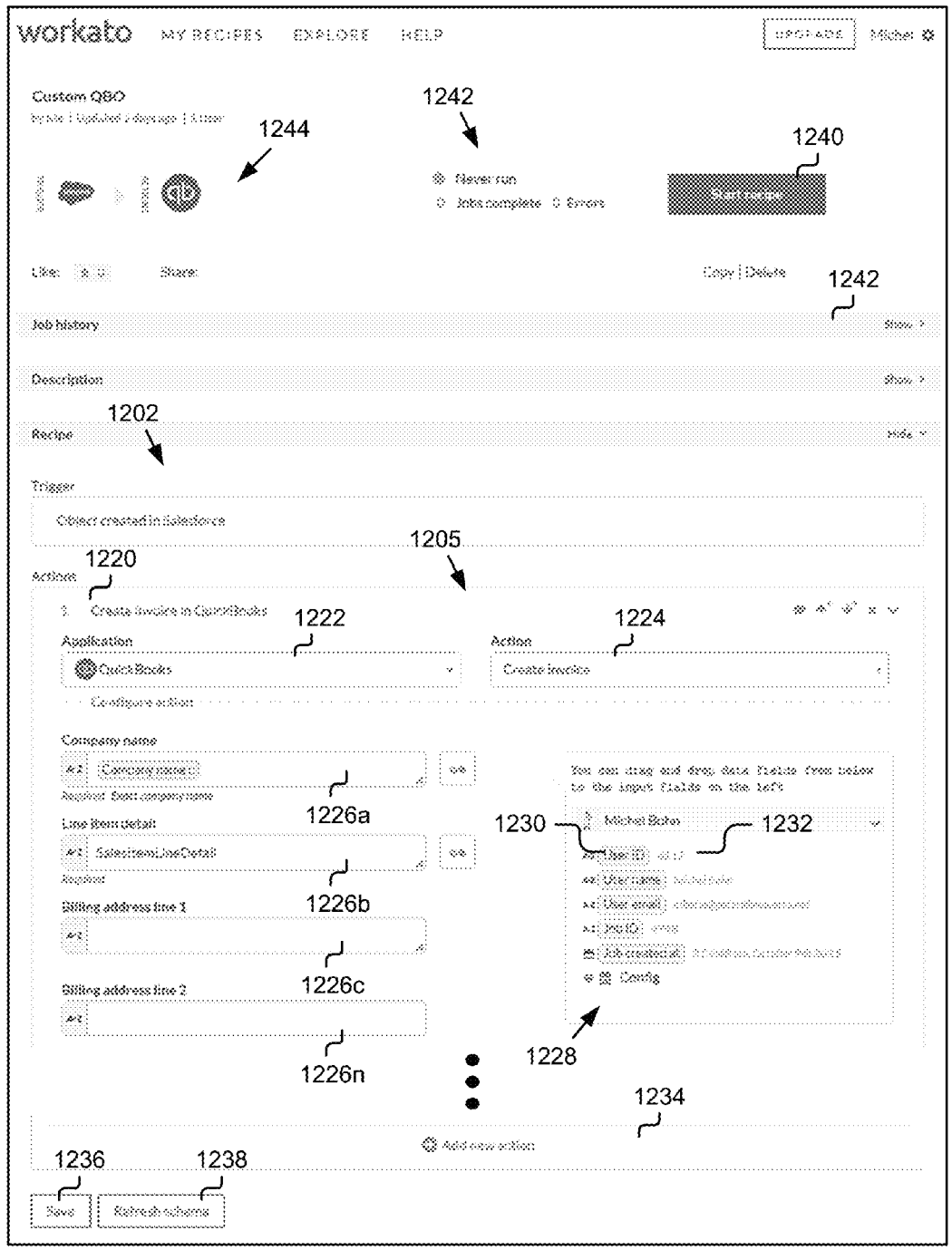

The interface 1200 also includes one or more action sections 1205 for configuring the various actions of the recipe, as shown in FIG. 12E. The action section 1205 may include an application definition element 1222, and action definition element 1224, action parameter elements 1226 (specifically referred to as 1226a-1226n), and the data fields region 1228 including data fields 1230. The application definition element 1222 may be substantially similar to the application definition element 1204 and the description of that element will not repeated here for the purpose of brevity. In the depicted example, the selected application is the QuickBooks™ web application.

The action defined by the action definition element 1224 may be any action that can be executed using the application defined via the application definition element 1222. For example, any action (e.g., functionality) offered by QuickBooks™. The action parameter elements 1226 are parameters (e.g. optional, required, etc.) that may be used to carry out the action defined in an action definition element. For example, in order to create invoice, information about the company name, the line items in the invoice, e.g. the applicable billing address, are needed and defined using the action parameter elements 1226. As discussed elsewhere herein, drag and drop data fields populated in to the data fields region 1226 may be used by the user to conveniently and easily fill in the action parameter elements 1226.

FIG. 12E also depicts other possible aspects of the graphical user interface 1200. For example, the interface 1200 may include a high-level view 1244 of the recipe showing a diagram including blocks for the trigger and the actions included in the recipe, a stats region 1242 including statistics about the execution of the recipe, such as the number of times the recipe is been run, the number of times the recipe granted completion, and the number of errors encountered, etc., a user-selectable element (e.g., a start recipe button) 1240 that, when selected, triggers the generation and sending of a start recipe request to the integration management system 100, and other aspects, such as options for copying and deleting the recipe, sharing the recipe with other users of the platform, indicating a disposition for the recipe (e.g., liking the recipe), and informational regions such as metadata about the recipe (e.g., the author, the lifetime the recipe was updated, the number of users using the recipe, etc.), job history 1242, and a description of the recipe.

Figure 13A:
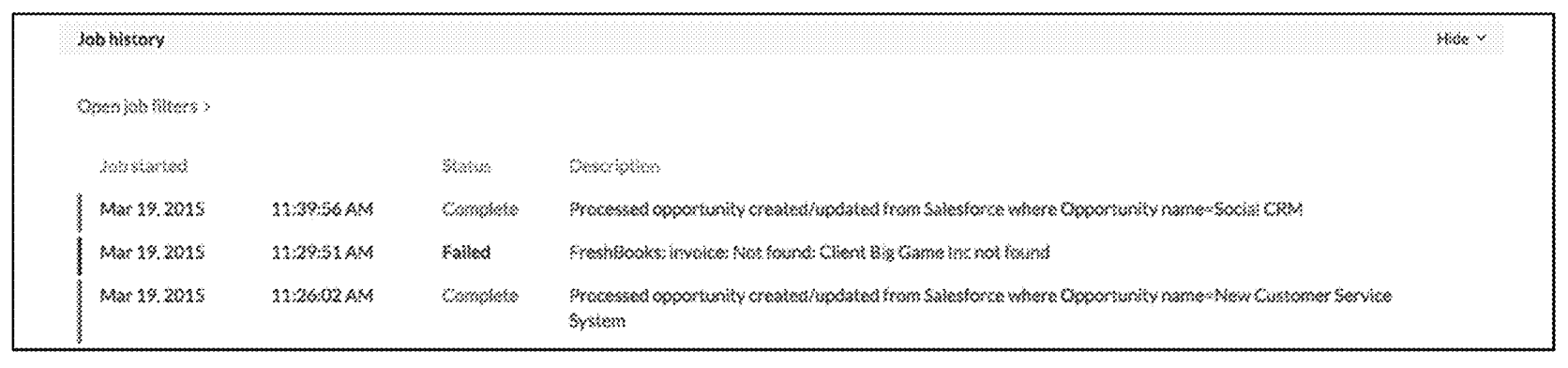
Figure 13B:
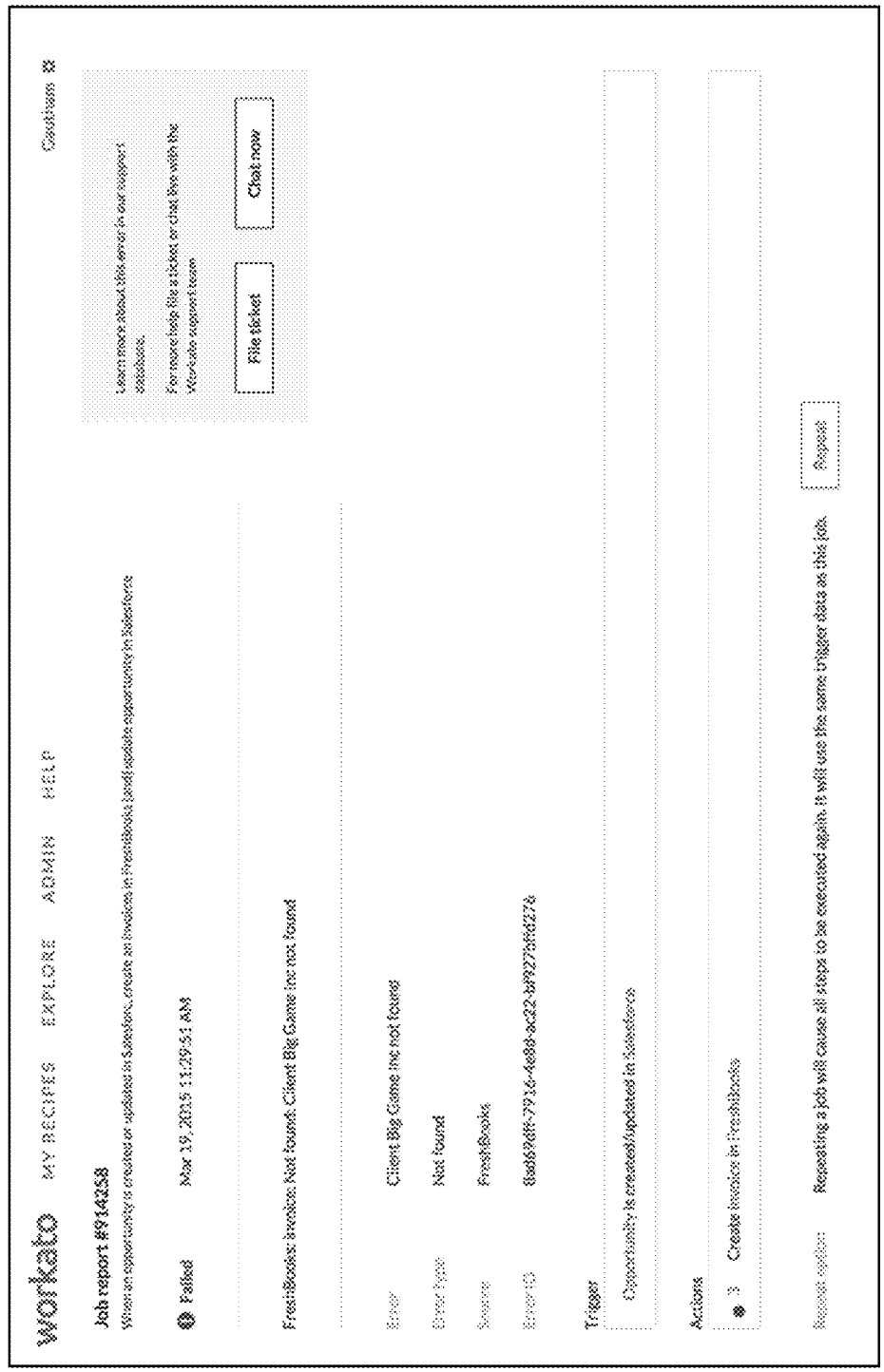

Regarding job history, a user may expand the job history 1242 region to view specific information about each time a recipe was run. For example, as shown in FIG. 13A, information about why a particular execution instance of the recipe failed may be viewed, such as when the job was started, what the status of the job was, a description of the error(s) encountered, etc. As illustrated in FIG. 13B, additional details about an error encountered may be displayed in an expanded view. The additional details, as seen in FIG. 13B, may include the error, the error type, the source of the error, and an error id.

Once the recipe has been defined, the user may save the recipe by selecting the user selectable save element 1236. Additionally, the user may refresh the schema backing the interface 1200 by selecting the refresh schema user-selectable element 1238. This is helpful when the user is confronted with an error, addresses the error by separately opening the web application being automated and making configurations to objects within that web application, revising the objects being referenced, etc., and reloads the schema associated with that web application (which is accessible and retrievable by the system 100 via the APIs of that web application).

APIs traditionally have been programmatically resolved through manual coding and integration performed by developers. The integration management system 100 automates API integration by abridging the underlying inner workings of the API. APIs expose the functionality of an application in discrete parts. For example, with reference to the QuickBooks™ example discussed above, the API may include a method for creating a new invoice, a separate method for adding lines to an invoice, and yet another method for fetching customer details. APIs are typically designed in this way efficiency on the web application-side but the efficiency comes at the cost of substantial loss in usability on the user-side.

The integration management system 100 includes software classes of adapters configured to interact with the APIs of the supported web applications. The adapters connect to the API to retrieve the schema and the integration management system 100 processes it. The adapters are capable of using standard objects backing the web applications, as well as custom, user-defined objects defined by users via the web applications. The custom, user-defined objects are referred to herein as extended objects in some cases. The extended objects may be input data or output objects (form fields, other data types, custom methods, custom tabs or apps, etc.).

Data schemas describe the characteristics of the data objects and methods accessible via web application APIs, and are often fundamentally designed for storage and retrieval efficiency. However, the format and makeup of the schemas often vary widely and are difficult to interpret by end users. This problem is greatly exacerbated when integrating many different web applications that were not designed to work together, and makes it impractical to hide schema complexity by using custom UI (visual) constructs.

The integration management system 100 maintains a list that maps objects in one application to the objects of other applications (e.g., the account of application A to the account of application B). The integration management system 100 builds and maintains knowledge mapping the different business objects and their corresponding data fields. In some embodiments, the integration management system 100 automatically computes and defines these relationships across each application based on schema that is retrieved and stored by the system 100. As a result, when a recipe is executed, it can relate (e.g., update, correlate, etc.) objects across multiple disparate applications that were never intended to be used together.

Figure 14:
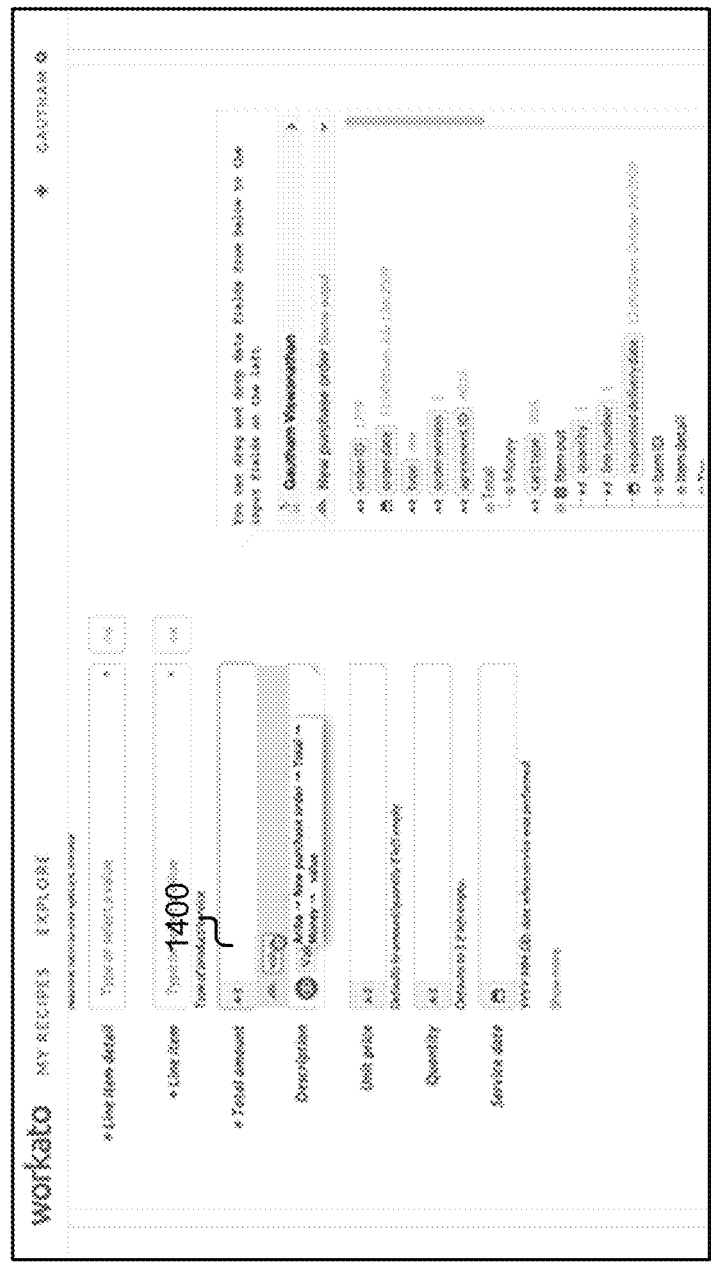
FIG. 14 is a graphical representation of an example graphical user interface for presenting a recipe object recommendation.
Figure 15:
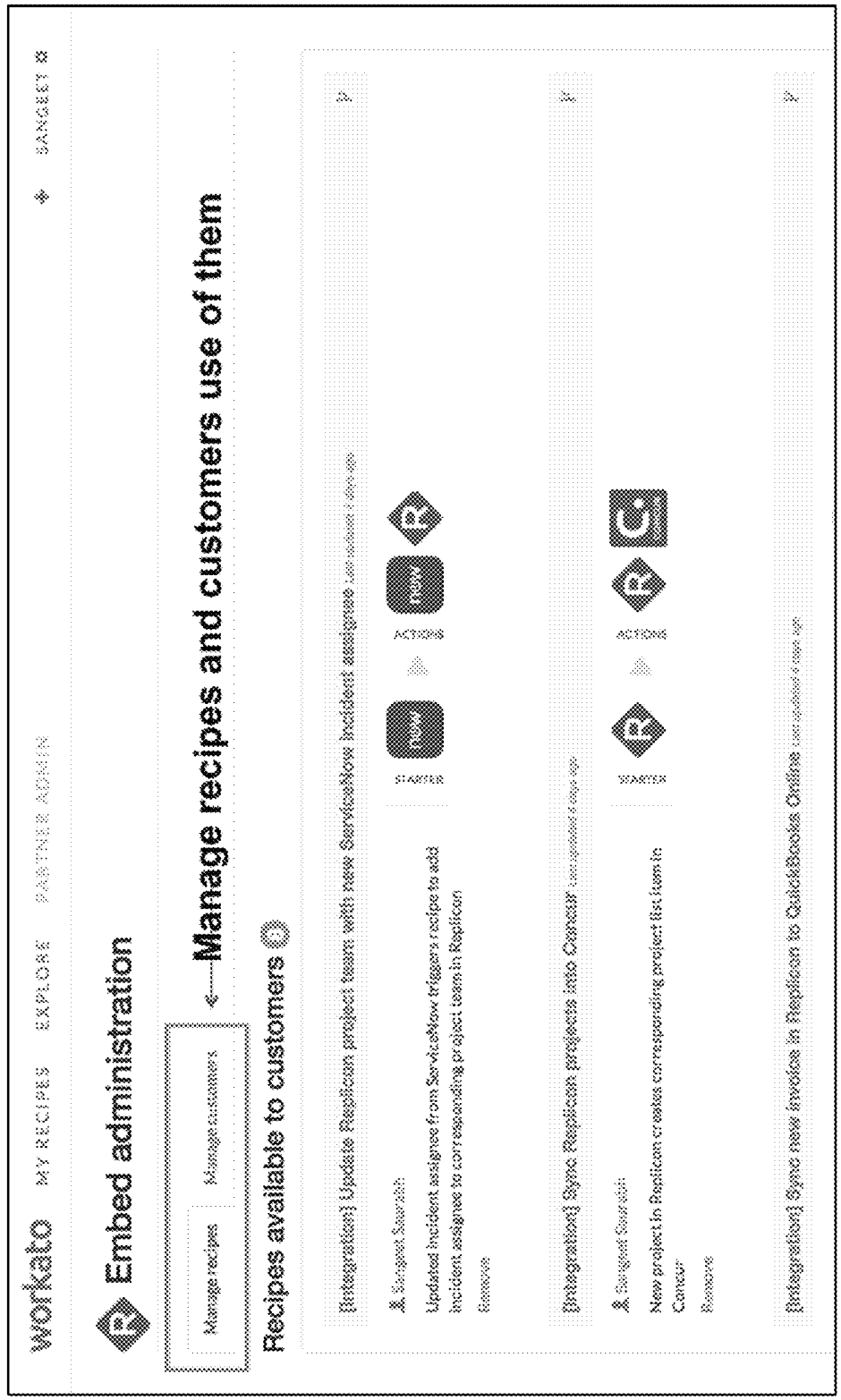
FIG. 15 is a graphical representation of an example recipe management interface.
Figure 16:
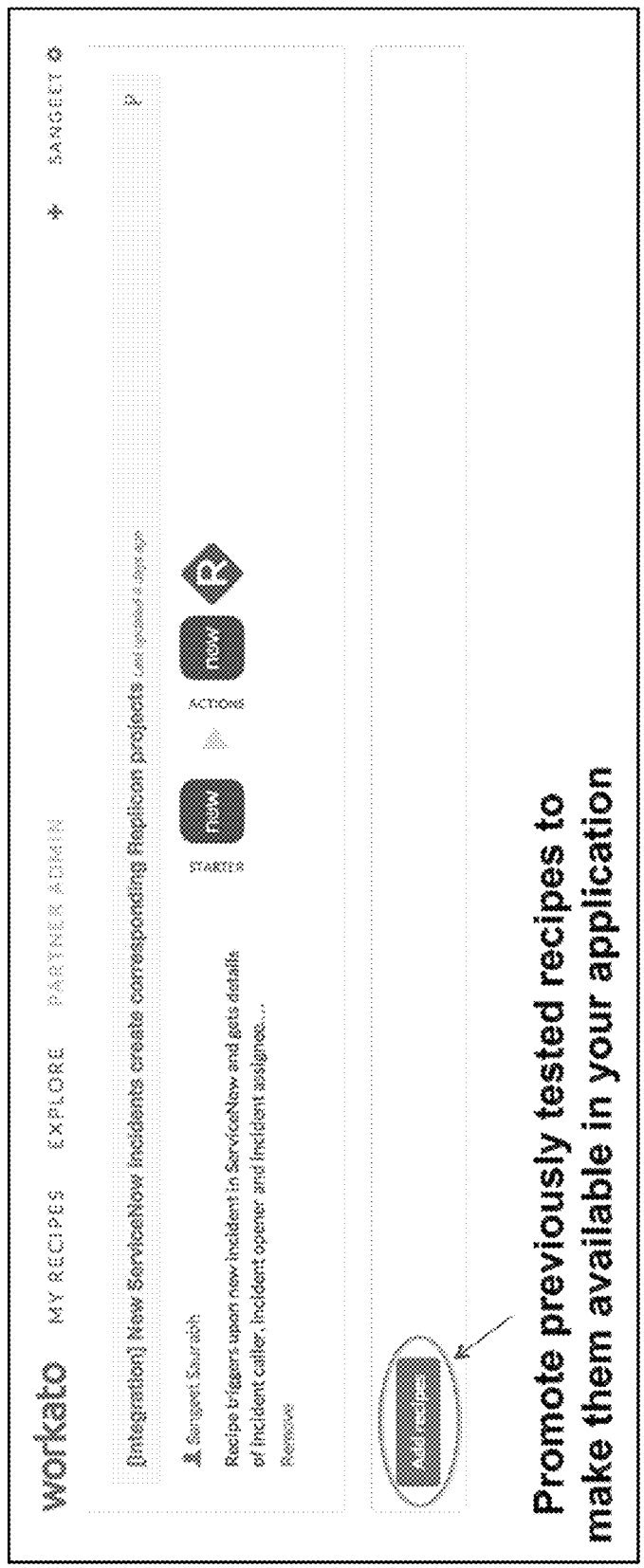
FIG. 16 is a graphical representation of an example interface providing a user the option to add recipes making them available for use in an application.
Figure 17:
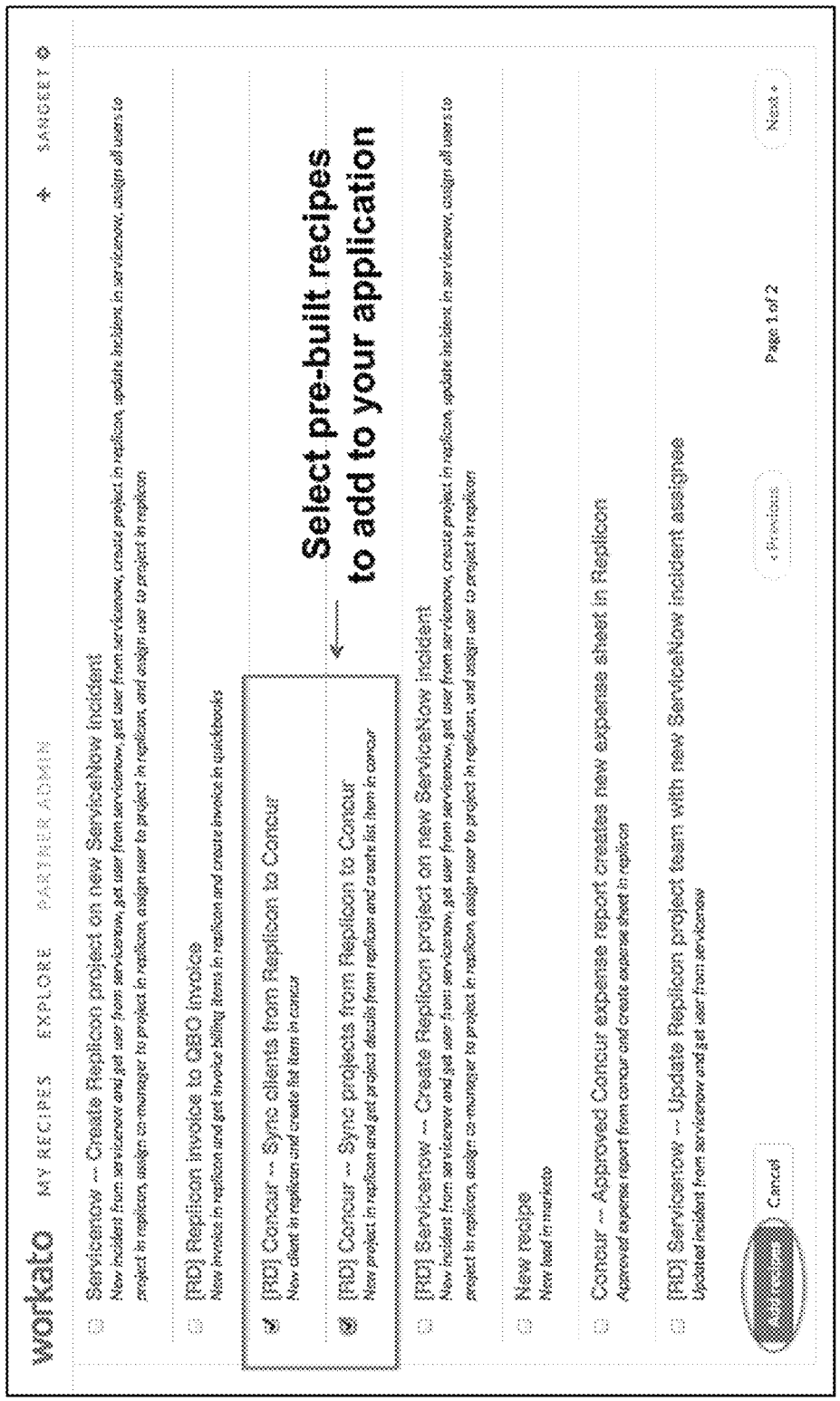
FIG. 17 is a graphical representation of an example interface providing an end user the option to select prebuilt recipes to add to an application.
Figure 18:
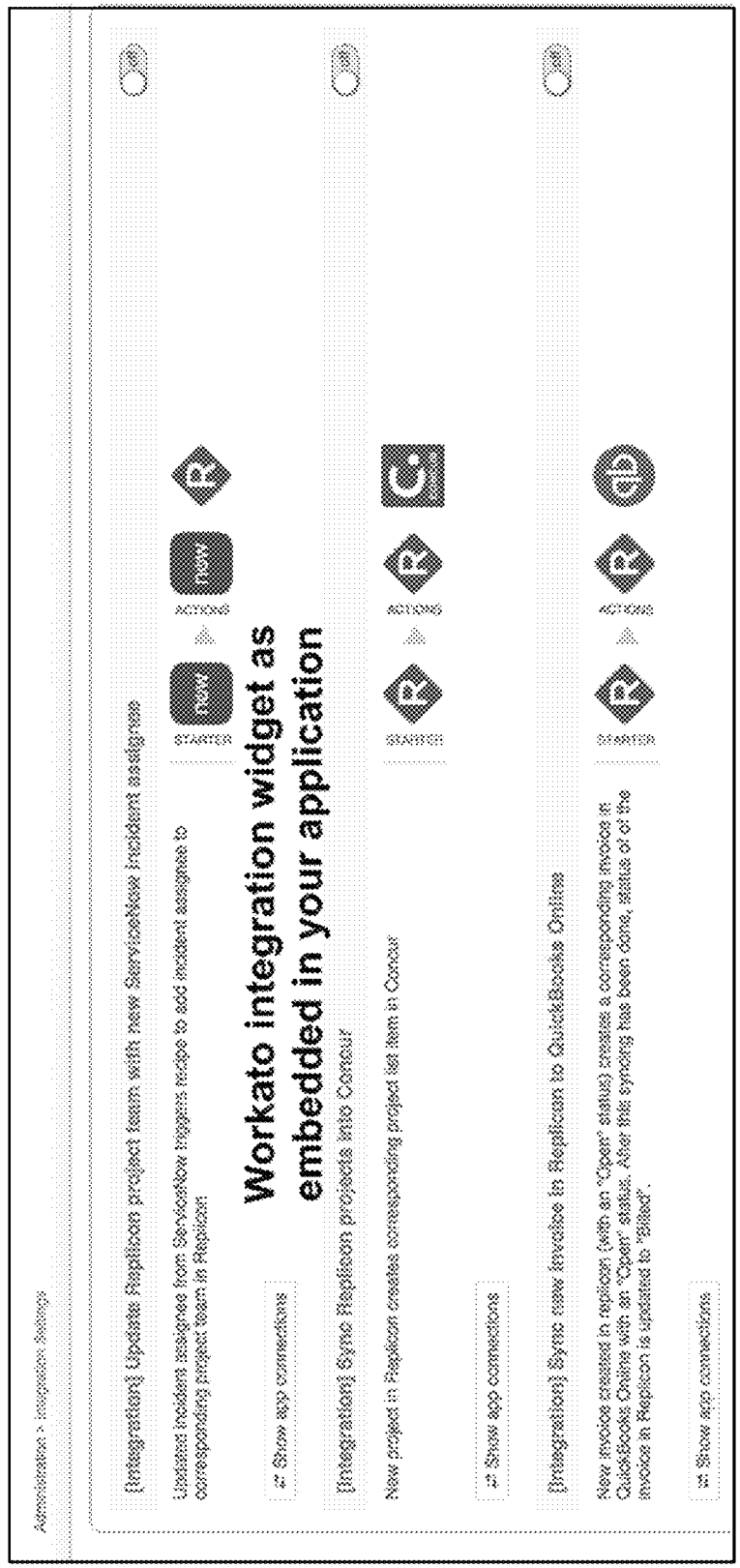
FIG. 18 is a graphical representation of an example interface illustrating an integration widget as embedded in an application.
Figure 19:
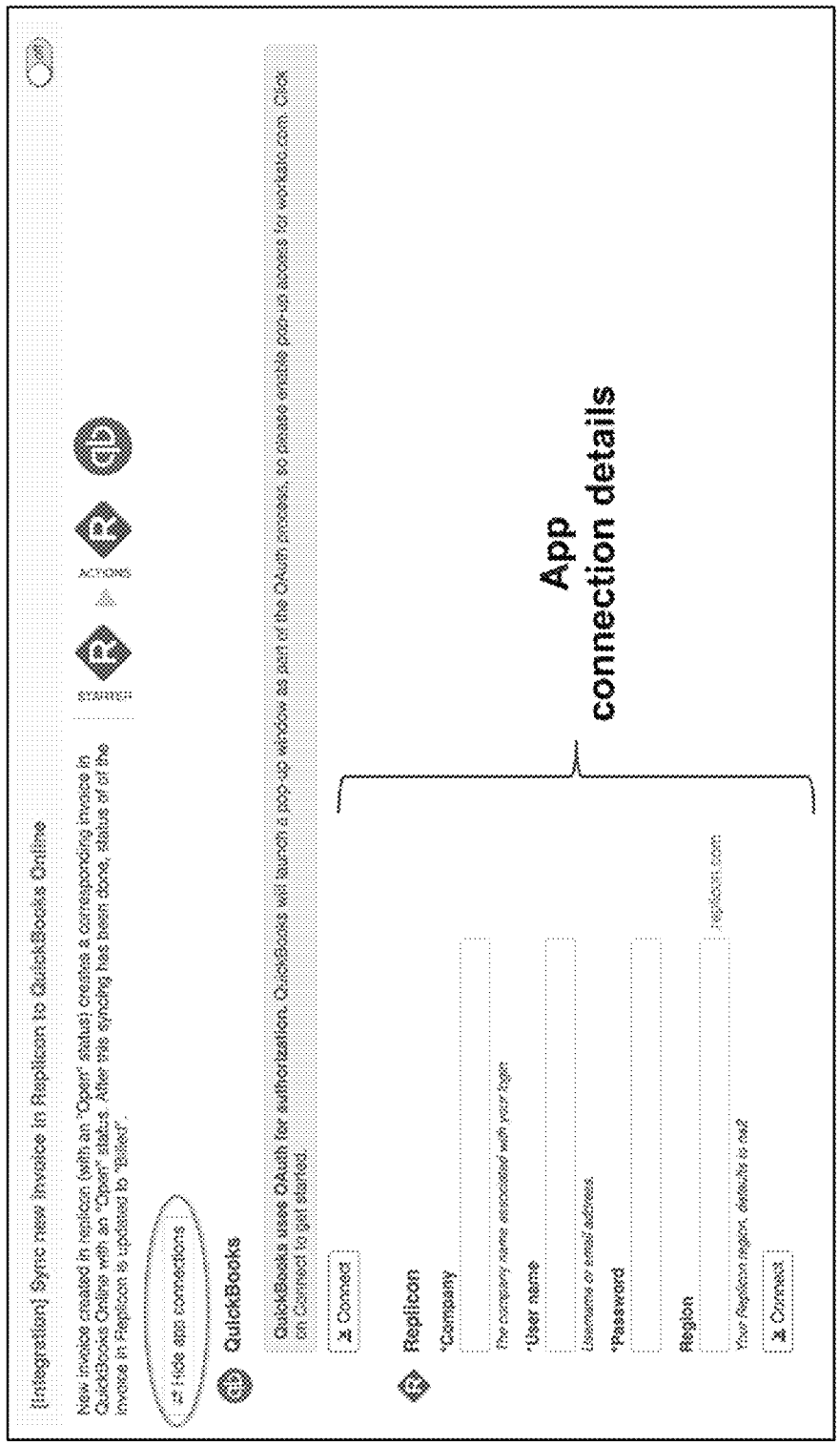
FIG. 19 is a graphical representation of an example interface allowing a user to hide or display app connection details.
Figure 21:
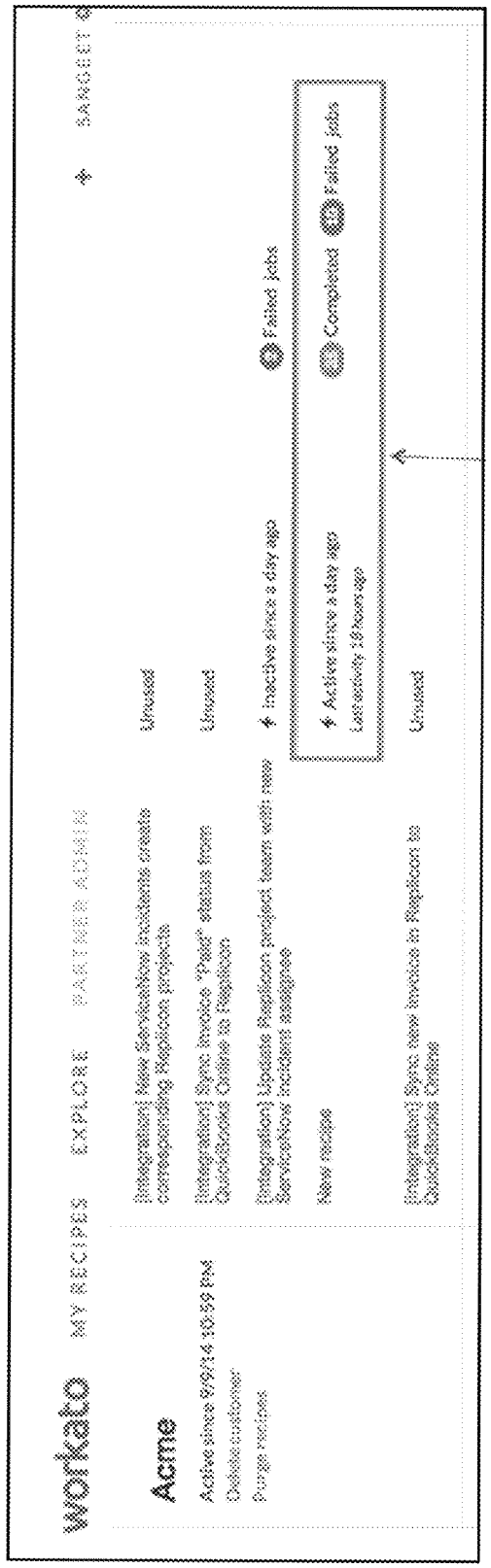
FIG. 21 is a graphical representation of an example interface displaying details about a partner/user and the activity status of associated recipes.

In managing the mapping knowledge base, the integration management system 100 simplifies the underlying schema using a combination of techniques that include pattern matching rules, observing other schemas stored and managed by the system 100, and applying machine learning to this data corpus. For instance, for objects that include the same or similar names, the integration management system 100 can identify the sameness or similarities using pattern matching (e.g., text comparison, etc.). Additionally, as the integration management system 100 receives mappings performed by end users using the recipe interfaces described herein, the system 100 learns and tracks the mapped objects and can provide inline recommendations 1400 for future mappings, as depicted in FIG. 14, particularly for the most popular mappings desired by end users. Further, the integration management system 100 can apply machine learning techniques to the foregoing mappings to identify and recommend mappings that have never been offered before.

When determining the recommendation, the integration management system 100 may query the database 124, which may store a table that stores data describing the number of times a particular object field has been mapped, and to which fields it has been mapped to, and based on that information may determine whether to provide the recommendation. In some instances, the number of times a field has been mapped must satisfy a certain minimum threshold in order to trigger the recommendation.

The above mapping process advantageously yields schemas with less complexity (e.g., less arbitrary nesting and/or hierarchy, more meaningful names, etc.). More specifically, the integration management system 100 can map the relationships between different data objects and types, and automatically invoke the appropriate API, at the appropriate time, to retrieve related data. This advantageously relieves the user from having to utilize or understand the underlying dichotomy between data relationships and API methods, as illustrated in FIGS. 12A-12E.

The integration management system 100 can generate and provide an end user graphical user interfaces that allows the end user to visually work across different applications on an integration platform and not at the API level as a software developer does. The integration management system 100 can interpret and stitch schema (e.g., connect data structures of different applications) at the data level, which makes the logical representation to the end user possible and obviates the need for the end user to have an understanding of software programming.

For instance, in an example involving the creation of an invoice, the integration management system 100 uses schema to visually render how an invoice looks. For example, the integration management system 100 analyzes the structure of the invoice by retrieving and examining the invoice schema. The schema of the invoice, for example, describes the structure of the invoice including its data fields and underlying data relationships. Then, the system 100 may define relationships in the schema by making annotations in the schema. For example, the schema may show that a particular id field in the invoice points to a customer. In this way the schema governs how a customer object looks. The annotations may be added so when an end user sees the visual representation of the schema and selects the customer, the system 100 maintains in its knowledge base that this particular field points to a customer, thus dynamically stitching/mapping them to one another. The system 100 then dynamically builds the relationship and fetches the schema that governs the customer.

Continuing this example, at design time, a field from the customer object is used for mapping, and at run time, the integration management system 100 dynamically resolves this relationship using mapping data identifying that the two different objects are governed by two different API calls/methods. To the end user, the relationship between the objects appears seamless, while on the system level, the API calls are coordinated to retrieve the appropriate data from the customer object at run time.

This provides the benefit of transparency and reduced complexity (about how these relationships are formed and maintained) to the end user. For instance, the end user is not required to know or understand how object A links to object B. In fact, there is no need for the user to understand where the data originates from or how certain fields relate. Instead, the data is logically presented and the applications integrated by the integration management system 100.

In another example, the system 100 may render what a case object looks like and determine that it points to two data structures, an account and a contact. In this example, the case object has a pointer, a link to an account and a link to a contact. When a selection is made, the integration management system 100 dynamically constructs the shape of the account object. Specifically, using schema annotations which further define the object, the service knows that a particular link points to an account object type. The integration management system 100 then may query the third-party (e.g., web) application to determine the form of the schema. The integration management system 100 can stitch the two objects together visually using schema. For example, when a contact is selected, the service computes the corresponding schema.

Stated another way, at design time, the integration management system 100 determines the relationships between objects using schema (queries the API to get the underlying schema structure, translates the schema, and formats it for display in the GUI), and at run-time, and the system 100 uses this determination (retrieves this data) to identify the correct API needed to retrieve the particular object (e.g., field) which is housed under the account object specifically, and housed under the case object generally. For instance, once the identity of a specific id is determined, using the schema annotations, the integration management system 100 knows that the id points to an account. Based on this knowledge, the system 100 can determine the API needed to retrieve the account object, and then utilizes it to retrieve it.

The user may submit a recipe start request to the server system 150 using the client application 108 (e.g., by selecting the start recipe button 1240 in FIG. 12E). The web server 120 receives and interprets the request, initializes a worker instance 128, and/or stores record of the request in the database 124. The event poller 132 process to 126, manages the recipe start request, and when ready initializes a worker instance 128 to execute the recipe corresponding with the start request. The secure container 130 of the worker instance 128 processes the recipe. The recipe code is retrievable from the database 124 or 138. The worker instance 128 can create an event instance 134 to monitor the trigger event. The event poller 132 registers the trigger event with the trigger event queue 126, and then polls the queue 126 for information regarding completion of the call, processes the information, and determines whether the event completed. If the event poller 132 determines that the trigger event has occurred, it returns a corresponding signal to the secure container 130, which initializes or continues processing depending on what point the recipe processing is at. At each step in the process, the various components may store and retrieve related data in the databases 124 and/or 138, as applicable. The worker instance 128 can communicate with the other components of the server system 150, the third-party application(s) 160, and other components of the system 100 directly or via other components.

Recipe Sharing

Figure 3:
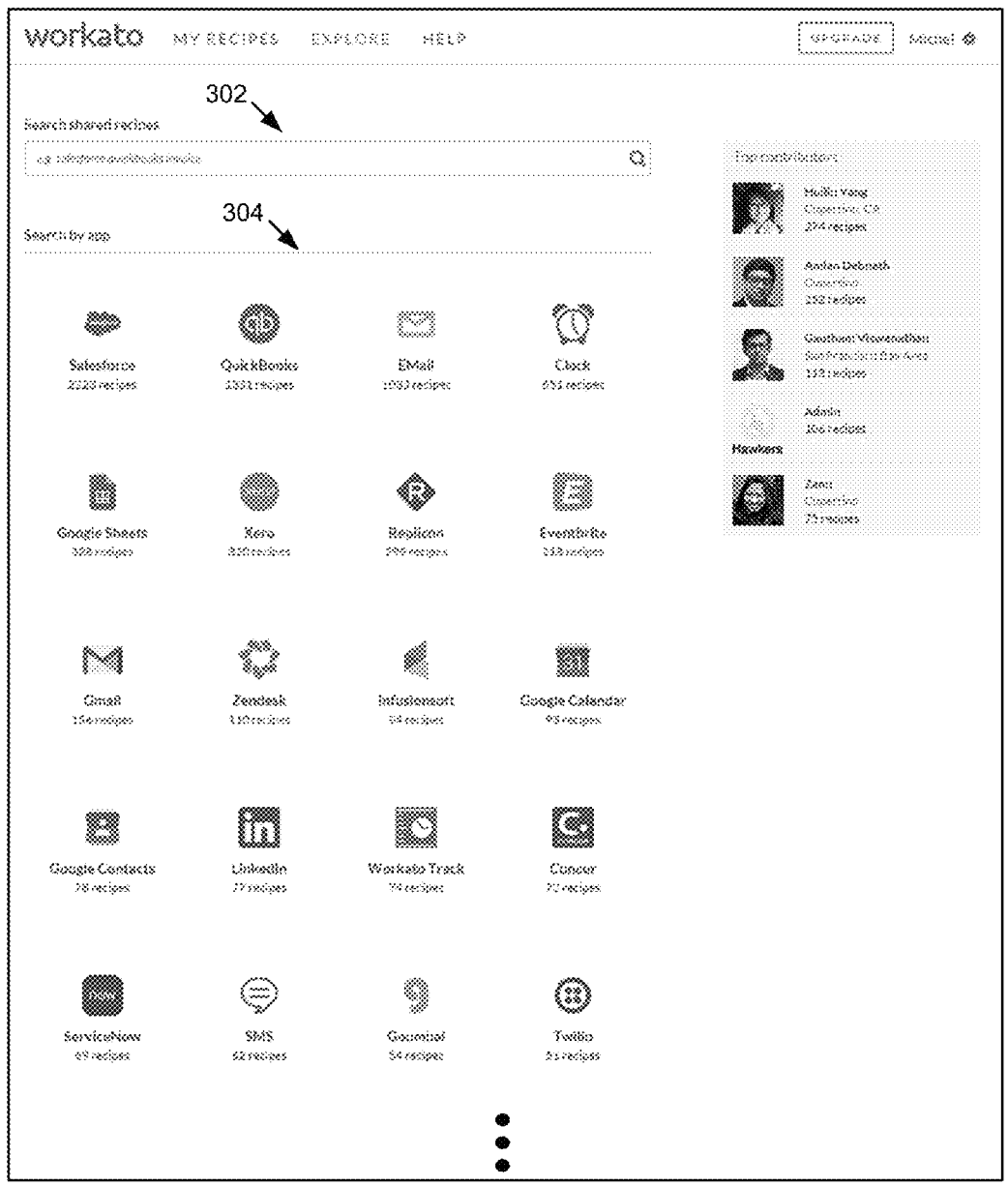
FIG. 3 is a graphical representation of an example recipe search interface.
Figure 4:
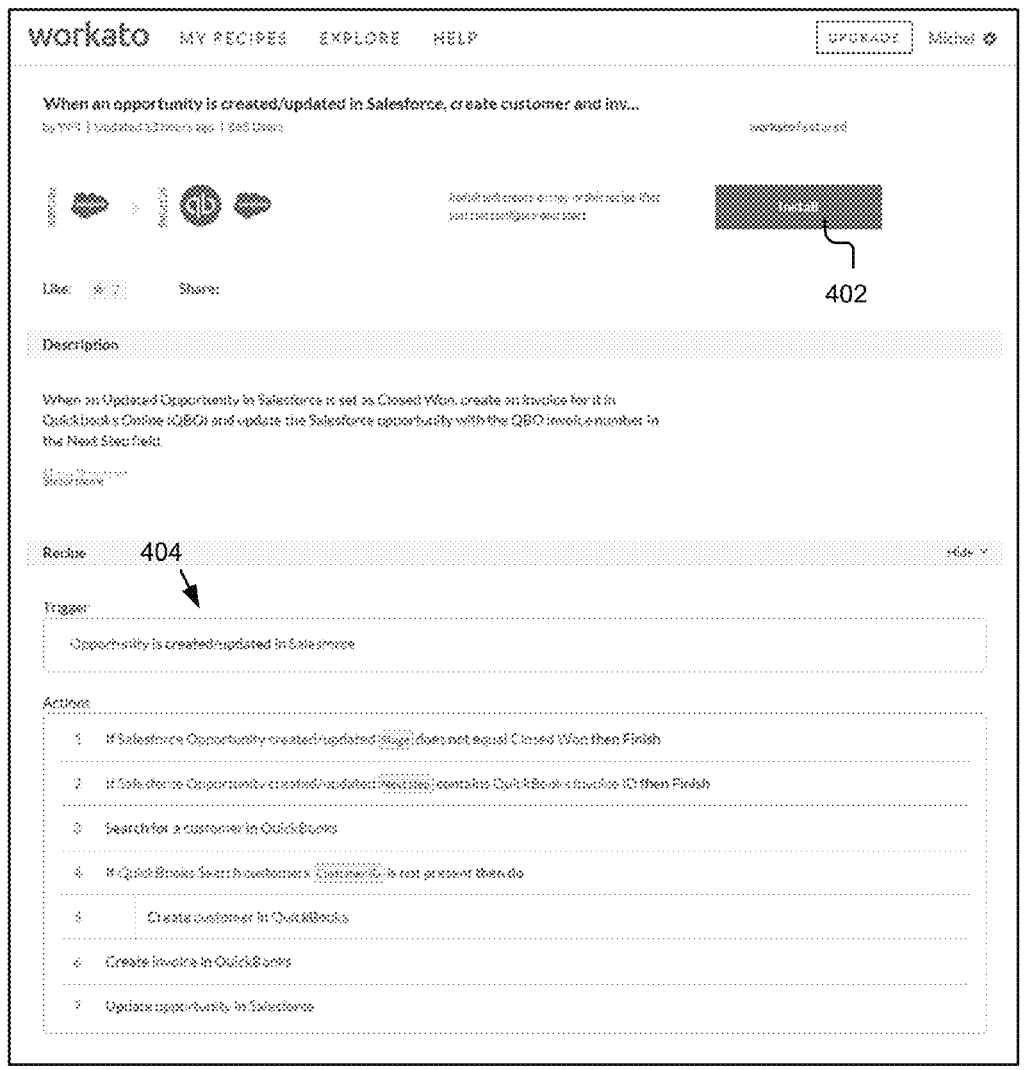
FIG. 4 is a graphical representation of an example recipe interface showing information about the recipe and providing an end user the option to install the recipe.

The integration management system 100 enables a community of users globally to create, share, improve and use community recipes. In FIG. 3 is a graphical representation of an example recipe search interface 300. In this figure, the client application 108 generates and displays the recipe search interface 300, which includes a search region 302 for searching by keyword for existing applications that have been shared by other users, and a browsing region 304 in which users can browse to various applications based on category (e.g., according to the web applications that they relate to). FIG. 4 is a graphical representation of an example recipe interface 400 showing information about the recipe and providing an end user the option 402 to install the recipe (e.g., by selecting the install button). The recipe interface 400 further includes a recipe description listing the trigger and action logical algorithm steps that the recipe includes, as well as identifying the objects that need to exist in order for the recipe to run properly (e.g., Stage, Step, Customer ID, etc.). Responsive to the selection of the option 402 to install the recipe, the client application 108 may generate and display interfaces representing an install wizard installing the application.

Figure 5A:
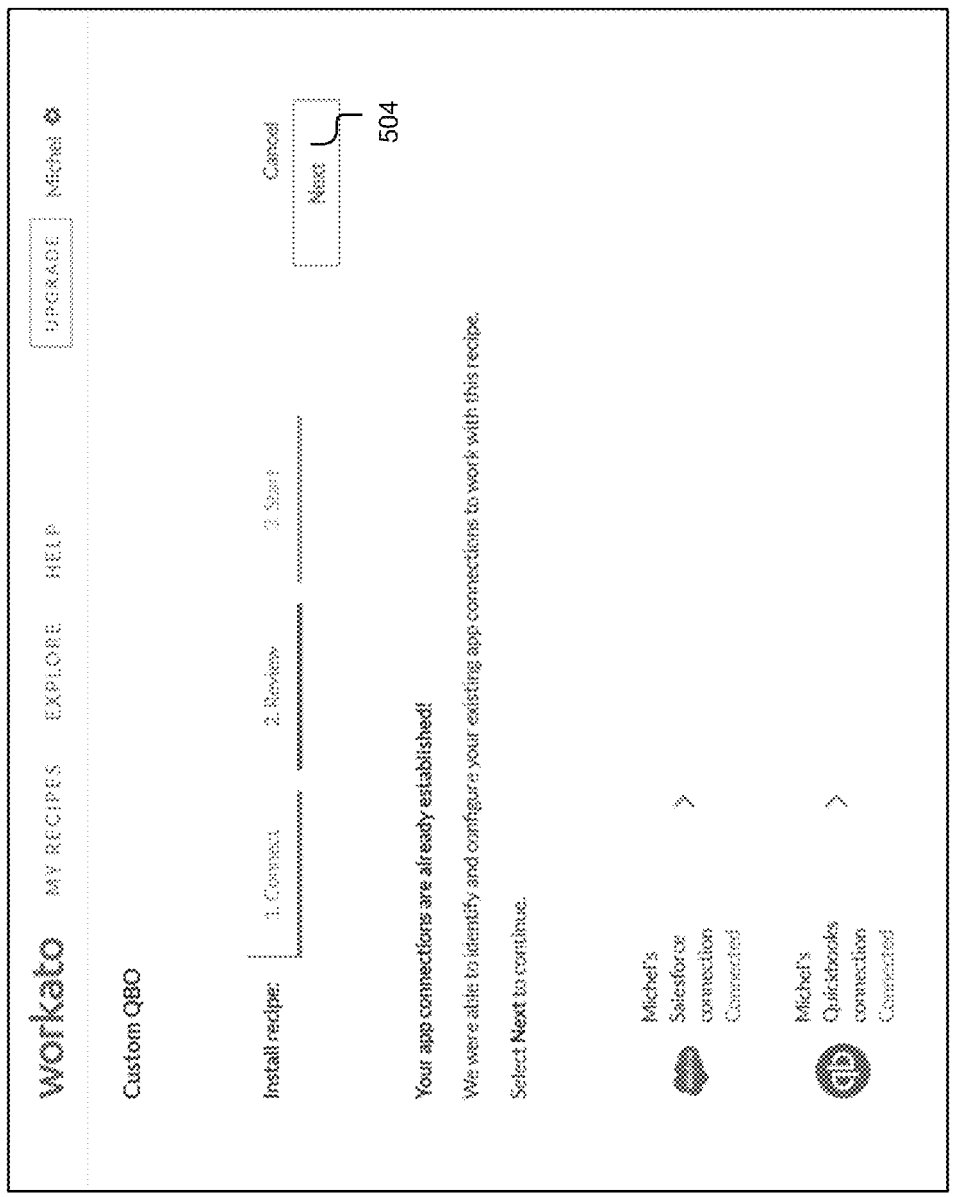
FIGS. 5A-5C are graphical representations of an example application installation interface.
Figure 5B:
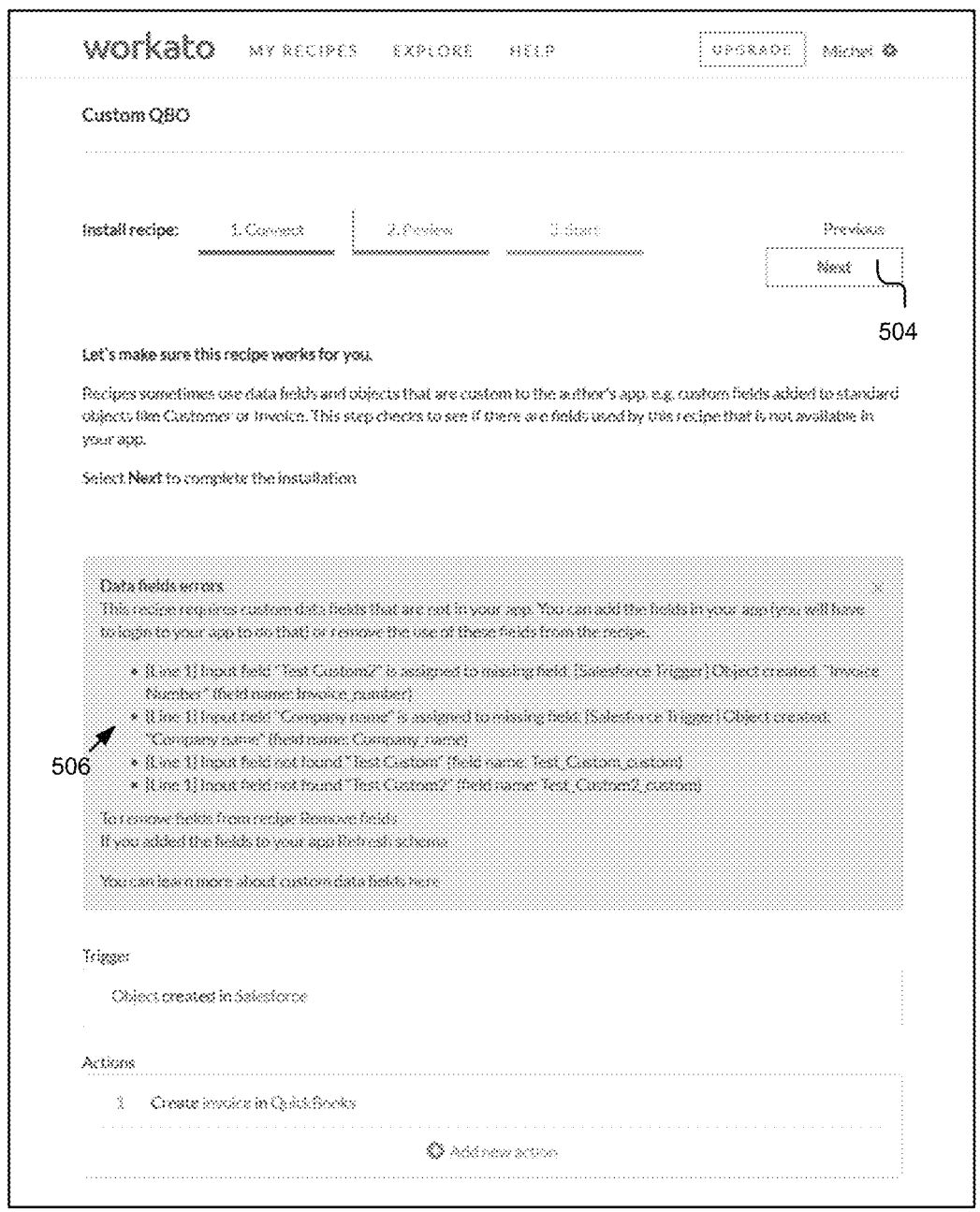
Figure 5C:
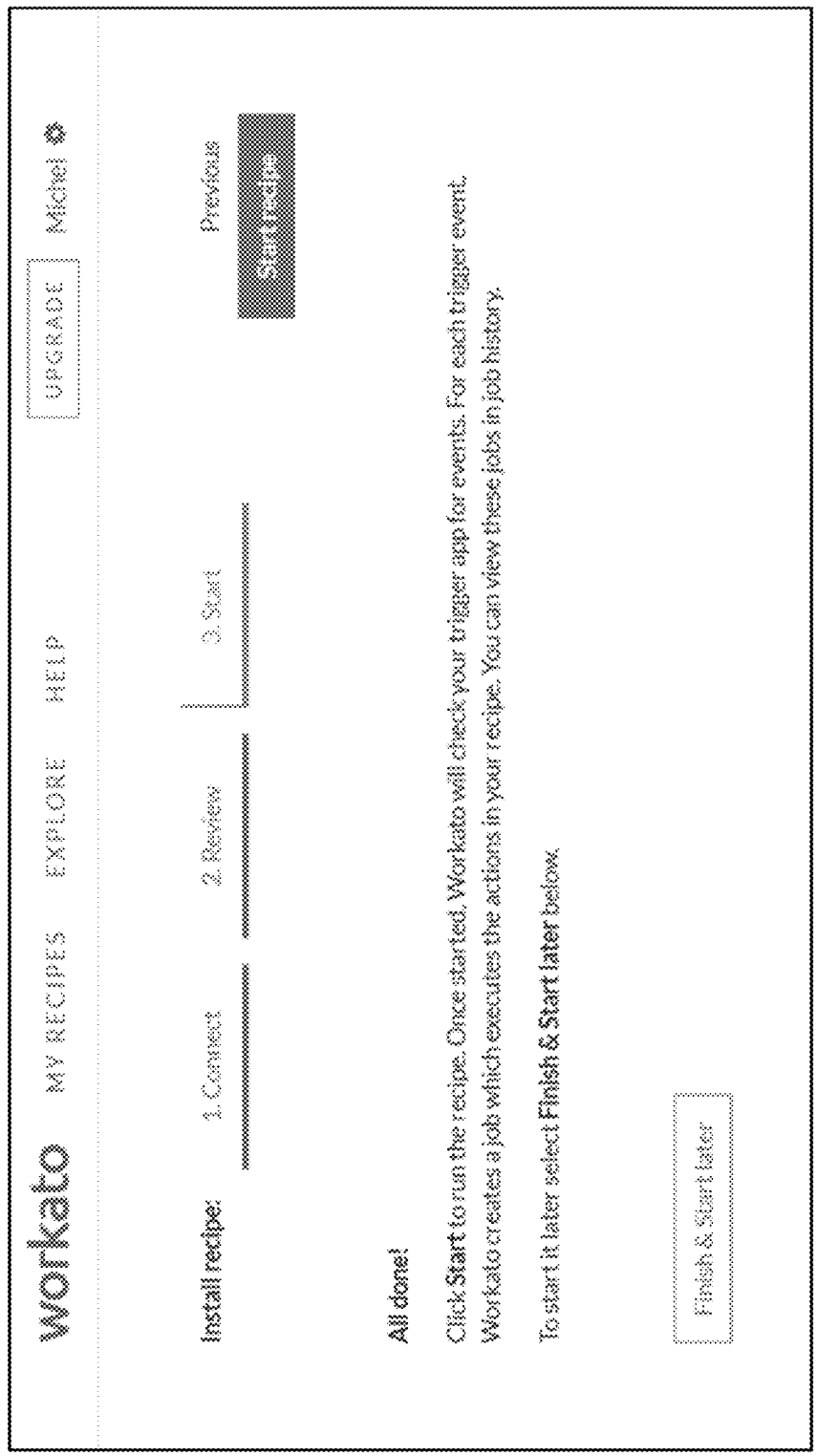
Figure 6:
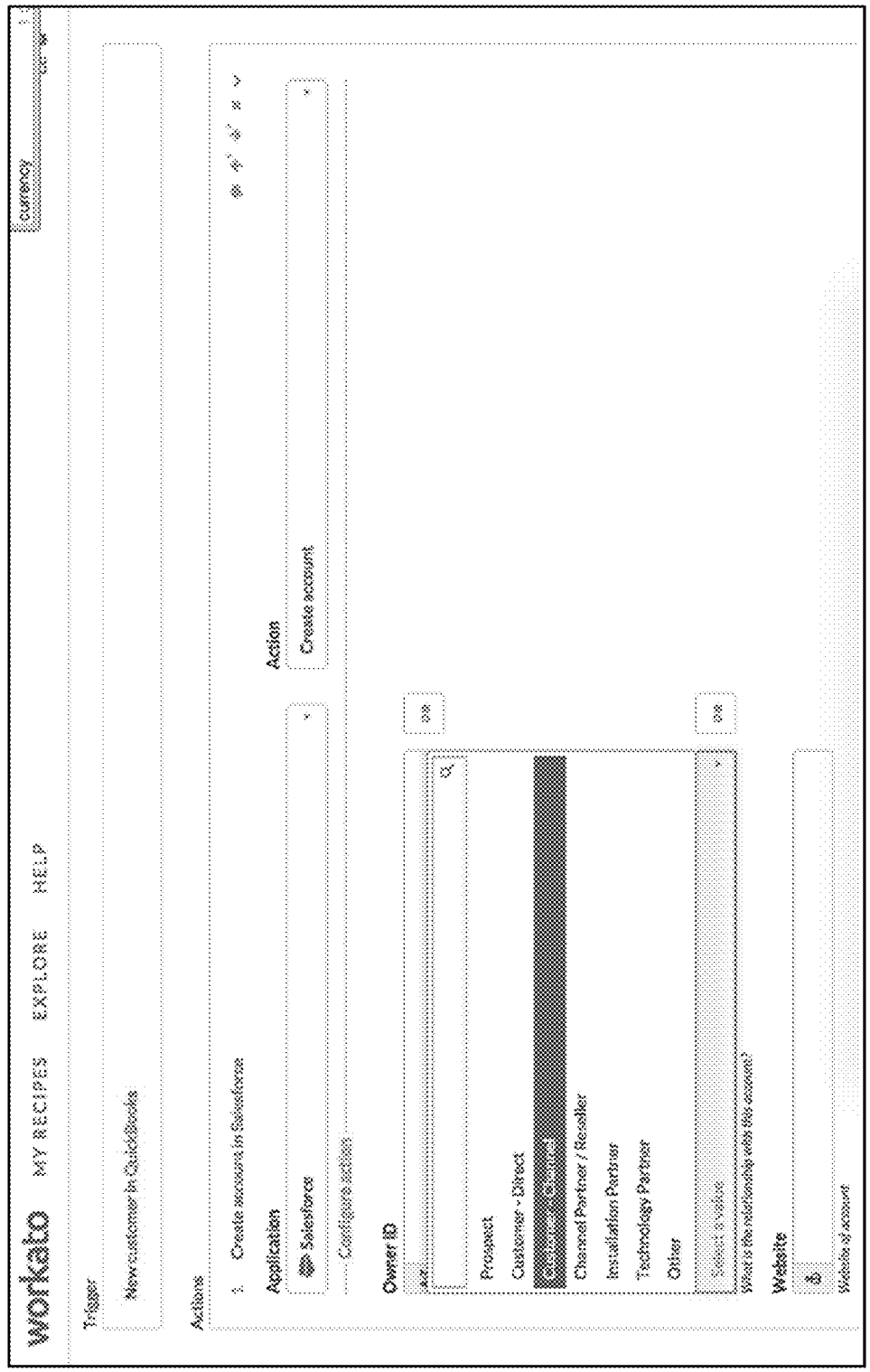
FIGS. 6 and 7 are graphical representations of an example recipe editing interfaces providing a user the ability to adapt a recipe configuration using drag and drop fields.

FIGS. 5A-5C are graphical representations of an example application installation interface 500. In FIG. 5A, the graphical user interface 500 includes fields for establishing connections with the external applications that the recipe would connect to when executed. These connections are required to allow data to be exchanged between the integration management system 100 and the third-party applications 160. Upon completing the connections and selecting the option 504 for the user to advance to the next portion of the installation (e.g., the next button), the client application 108 generates and displays the second aspect of the graphical user interface 500, which includes a content region 506 that identifies any errors confronted in installing the application for that user, as shown in FIG. 5B. Errors may arise based on differences between the copying user and the originating user's schema within the third-party applications 160 that are relied upon by the recipe. For example, the author of the recipe may have certain custom objects/fields set up in Salesforce™ that the copying user does not have set up, and the error may indicate which custom objects/fields those are. The user may resolve these errors by creating those custom objects/fields and then returning to refresh the schema.

Figure 7:
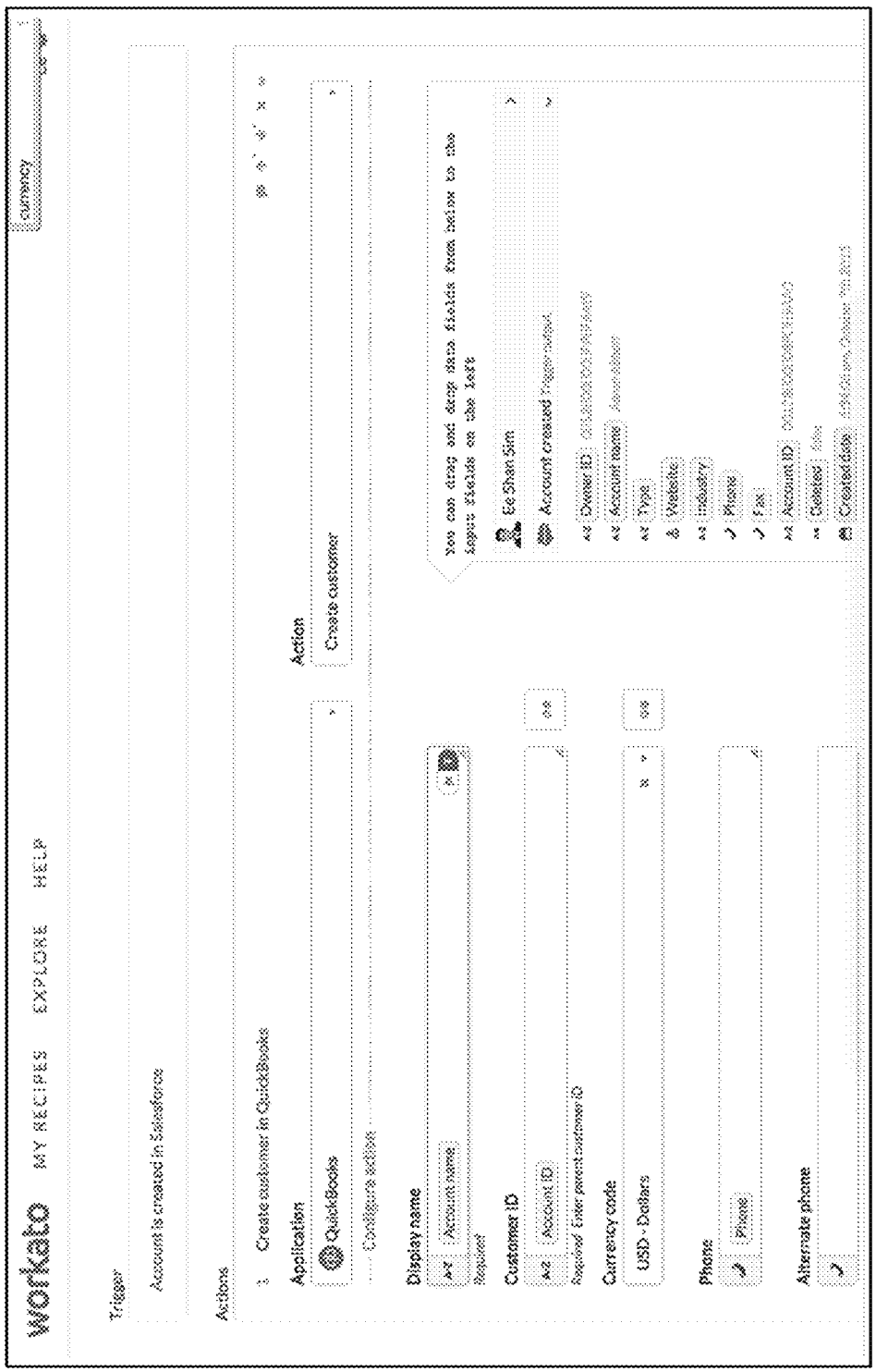

Upon resolving the errors, the user may select the option 504 to advance to the start recipe aspect of the graphical user interface 500, as depicted in FIG. 5C at which point the user may elect to start recipe or finish up and start the recipe at a later time. In some cases, prior to starting the recipe, the user may desire to further configure the recipe for his or her needs, using the interfaces 600 and 700 depicted in FIGS. 6 and 7, respectively. Additionally, the user may elect to adapt the recipe to accommodate his or her own specialized configurations to address any errors that may surface during installation process using the recipe editing interfaces, such as the interfaces 600 and 700. For example, during the defining of a recipe depicted in interface 600, the user may utilize the interface 600 to select an alternative variable (e.g., the customer-channel owner id). In a further example, as depicted in FIG. 7, the user may change the configuration, workflow, etc., not to use custom fields that the user does not have. In further examples, the user may replace the custom fields defined by the author with his or her own custom fields to address any custom field errors. As seen in FIG. 7, the interface 700 provides an opportunity for the user to drag and drop data fields to define objects.

The following code illustrates example code that may be used to generate the graphical user interface 500, and manage the creation and execution of the recipe that it embodies, etc., and is retrievable from the database(s) 124 and 138:

```
Salesforce trigger:
Name: "New object created in Salesforce"
Input: "object type" (list of types dynamically gathered from Salesforce)
Output dynamically depends on "object type". In this case object type is "Invoice"
"extended_output_schema":[
    {"type":"string","name":"Id","control_type":"text",
        "label":"Record ID","optional":true,"custom":false,"event_title":false,
        "key_scope":"Invoice_c"},
    {"type":"string","name":"OwnerId","control_type":
        "text","label":"Owner ID","optional":true,"custom":false,"event_title":false},
    {"type":"boolean","name":"IsDeleted","control_type":
        "checkbox","label":"Deleted","optional":true,"custom":false,"toggle_hint":"Select from option
        list","toggle_field":{"label":"Deleted","control_type":
        "text","toggle_hint":"Use custom
        value","optional":true,"custom":false,"type":"boolean",
        "name":"IsDeleted"},"render_input"
        :{ },"parse_output":{ }},
    {"type":"string","name":"Name","control_type":
        "text","label":"Invoice Name","optional":true,"custom":false,"event_title":
        true},
    {"type":"date_time","name":"CreatedDate","control_
        type":"date_time","label":"Created Date","optional":true,"custom":false,"render_input":
        "convert_date_time","parse_output":"
convert_date_time"},
    {"type":"string","name":"CreatedById","control_
        type":"text","label":"Created By ID","optional":true,"custom":false,"event_title":
        false},
    {"type":"date_time","name":"LastModifiedDate",
        "control_type":"date_time","label":"Last Modified
Date","optional":true,"custom":false,"render_input":
        "convert_date_time","parse_output":"
convert_date_time"},
    {"type":"string","name":"LastModifiedById","control_type":"text","label":"Last Modified By ID","optional":true,"custom":false,"event_title":
        false},
    {"type":"date_time","name":"SystemModstamp","control_type":"date_time","label":"System
Modstamp","optional":true,"custom":false,"render_input":"convert_date_time","parse_out
put":"convert_date_time"},
    {"type":"string","name":"Invoice_number_c","control_type":"text","label":"Invoice
Number","optional":true,"custom":true,"event_title":
        false},
    {"type":"string","name":"Company_name_c","control_type":"text","label":"Company name","optional":true,"custom":true,"event_title":false}
]
QuickBooks Online action:
Name: "Create invoice in QuickBooks"
"extended_input_schema":[
    {"type":"string","name":"ItemRefLine","control_
        type":"select","label":"Line
        item","hint":"Type of
product/service","pick_list":"get_items","sensitive":true,
        "toggle_hint":"Select
        line item","toggle_field":{"control_type":"text","label":"Item name","toggle_hint":"Set
        by item name","toggle_to_primary_hint":"Select line
item","toggle_to_secondary_hint":"Set
        by item name","hint":"Type of
product/service","sensitive":true,"type":"string","name":
        "item_name"}},
    {"type":"integer","name":"Amount","control_type":
        "text","label":"Total amount"},
    {"type":"string","name":"Description","control_
        type":"text-area","label":"Description"},
    {"type":"string","name":"Test_Custom_custom",
        "control_type":"text","label":"Test
Custom","optional":true,"custom":true,"definition":
        {"DefinitionId":"1","Name":"Test
Custom","Type":"StringType"}},
    {"type":"string","name":"Test_Custom2_custom",
        "control_type":"text","label":"Test
Custom2","optional":true,"custom":true,"definition":
        {"DefinitionId":"2","Name":"Test
Custom2","Type":"StringType"}},
    {"type":"string","name":"Test_Custom3_custom",
        "control_type":"text","label":"Test
Custom3","optional":true,"custom":true,"definition":
        {"DefinitionId":"3","Name":"Test
Custom3","Type":"StringType"}},
    {"type":"integer","name":"UnitPriceLine","control_
        type":"text","label":"Unit
price","optional":true},
    {"type":"integer","name":"QtyLine","control_type":
        "text","label":"Quantity","optional":true
    },
    {"type":"string","name":"PriceLevelRefLine","control_type":"text","label":"Price
level","optional":true,"extended":true,"sensitive":true},
    {"type":"boolean","name":"MarkupInfoLine_Percent-Based","control_type":"checkbox","lab
el":"Percentage
        mark up","hint":"Is price marked up by
``` percentage?","optional":true,"extended":true,"toggle_hint":"Select from option list","toggle_field":{"label":"Percentage mark up","control_type":"text","toggle_hint":"Use custom value","optional":true,"extended":true,"hint": "Is price marked up by percentage?","type":"boolean","name":"MarkupInfoLine_PercentBased"},"render_input":{ },
"parse_output":{ }},
 {"type":"integer","name":"MarkupInfoLine_Value", "control_type":"text","label":"Mark up value","hint":"Absolute value price is marked up at", "optional":true,"extended":true},
 {"type":"integer","name":"MarkupInfoLine_Percent", "control_type":"text","label":"Mark up percent","hint":"Percentage value (out of 100) price is marked up at","optional":true,"extended":true},
 {"type":"string","name":"MarkupInfoLine_PriceLevelRef","control_type":"text","label":"Mar k up price level","optional":true,"extended":true},
 {"type":"string","name":"TaxCodeRefLine","control_type":"text","label":"Tax code reference ID","optional":true,"extended":true, "sensitive":true,"toggle_hint":"Select from list","toggle_field":{"control_type":"text","label":"Tax code name","toggle_hint":"Set by tax code","optional":true,"toggle_to_primary_hint":"Select from list","toggle_to_secondary_hint":"Set by tax code","hint":"Name of the tax code","type":"string","name":"tax_code_name"}},
 {"type":"date_time","name":"ServiceDateLine","control_type":"date_time","label":"Service date","hint":"Date when service was performed","optional":true,"render_input":"convert_date_time","parse_output":"convert_date_time"}]
Mapping:
"input":{
"CustomerMemo":"Thank you for your business and have a great day!",
"LineDetail":"SalesItemLineDetail",
"company_name":"#{_("data.salesforce.new_custom_object.Company_name_c")}",
"Amount":"100","Description":"the description",
"Test_Custom_custom":"hardcorded value",
"Test_Custom2_custom":"#{_("data.salesforce.new_custom_object.Invoice_number_c")}",
"ItemRefLine":"20"}
After error validation:
Trigger requirements:
"requirements":{
 "extended_input_schema":[ ],
 "extended_output_schema":[
  {"type":"string","name":"Invoice_number_c","control_type":"text","label":"Invoice Number","optional":true,"custom":true,"event_title": false},
  {"type":"string","name":"Company_name_c","control_type":"text","label":"Company name","optional":true,"custom":true,"event_title": false}]}
Action requirements:
"requirements":{"extended_input_schema":[
 {"type":"string","name":"ItemRefLine","control_type": "select","label":"Line item","hint":"Type of product/service","pick_list":"get_items","sensitive":true, "toggle_hint":"Select line item","toggle_field":{"control_type":"text","label":"Item name","toggle_hint":"Set by item name","toggle_to_primary_hint":"Select line item","toggle_to_secondary_hint":"Set by item name","hint":"Type of product/service","sensitive":true,"type":"string","name": "item_name"}},
 {"type":"integer","name":"Amount","control_type": "text","label":"Total amount"},
 {"type":"string","name":"Description","control_type":"text-area","label":"Description"},
 {"type":"string","name":"Test_Custom_custom", "control_type":"text","label":"Test Custom","optional":true,"custom":true,"definition": {"DefinitionId":"1","Name":"Test Custom","Type":"StringType"}},
 {"type":"string","name":"Test_Custom2_custom", "control_type":"text","label":"Test Custom2","optional":true,"custom":true,"definition": {"DefinitionId":"2","Name":"Test Custom2","Type":"StringType"}}],"extended_output_schema":[ ]}
Human visible errors:
[Line 1] Input field "Test Custom2" is assigned to missing field: [Salesforce Trigger] Object created: "Invoice Number" (field name: Invoice_number)
[Line 1] Input field "Company name" is assigned to missing field: [Salesforce Trigger] Object created: "Company name" (field name: Company_name)
[Line 1] Input field not found "Line item" (field name: ItemRefLine)
[Line 1] Input field not found "Total amount" (field name: Amount)
[Line 1] Input field not found "Description" (field name: Description)
[Line 1] Input field not found "Test Custom" (field name: Test_Custom_custom)
[Line 1] Input field not found "Test Custom2" (field name: Test_Custom2_custom)

Figure 9:
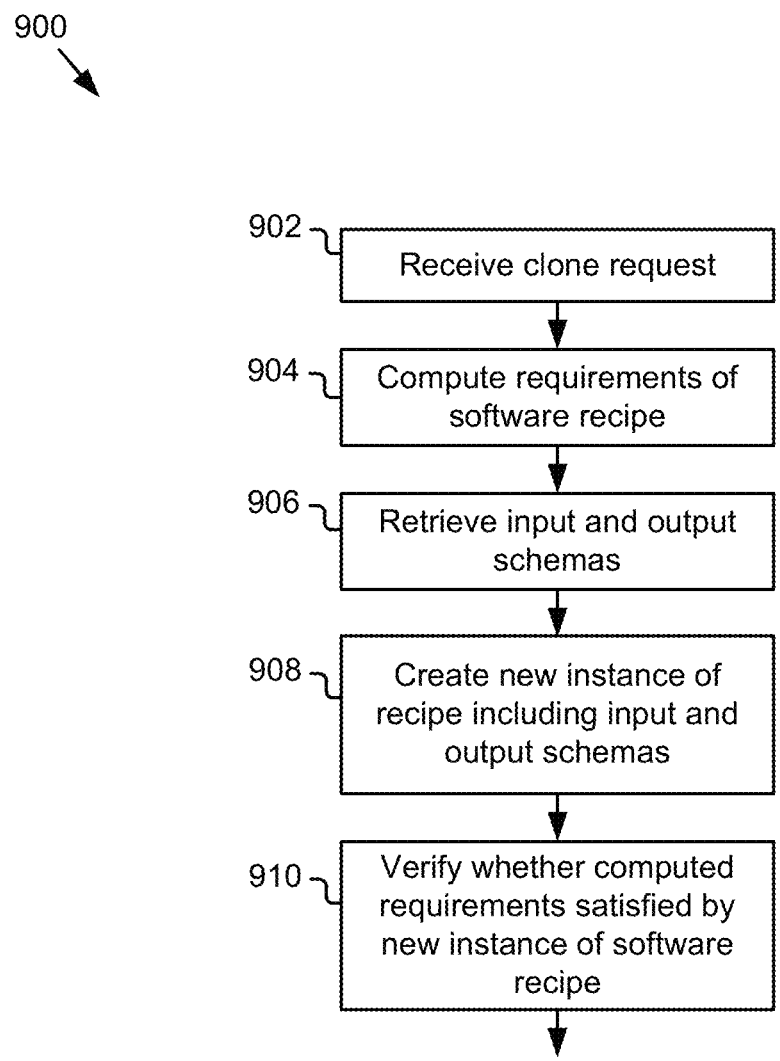
FIG. 9 is a flowchart depicting an example method for cloning a software recipe.

Thus, the integration management system 100 can advantageously build a set of recipes for a customer and allows these recipes to be used in the context of a different customer. FIG. 9 is a flowchart depicting an example method 900 for cloning a software recipe.

By way of illustration, the following is pseudocode reflecting example algorithms for cloning a recipe: For example, the following function is called when a user copies a recipe:
  cloneRecipe
  {
    // copy recipe contents as-is
    initRequirements( )
    if (app connection is available)
    {
      // get app connections from user
      schemaRefresh( )
    {
    errors=calcRequirementErrors( )
    updateRequirements(errors)
  }
At block 902, the method 900 receives a request from a user to clone a recipe. Responsive to receive the request, the method 900 computes requirements of the recipe in block 904. A recipe includes a trigger and one or more actions. Each trigger and action in a recipe has an input and an output schema associated with it. Extended and standard fields within a schema are tracked. Extended fields may be custom fields added to an application by an end customer. For example, the author of a recipe may have added two custom fields, e.g. a data field for region and a data field for language, to a standard Salesforce™ lead object. When a recipe is built the system may maintain a set of customizations in the recipe that are custom to a particular customer that is integrating applications. For example, the following function creates a requirements table listing the data fields, including the custom fields and the standard fields, in an input and output schema for the trigger and each of the actions in a recipe:

```
// first time creation of requirements table
initRequirements( )
{
    Requirements is computed as the extended input and
      output
    schemas for each action and trigger in the recipe
}
```

The method 900, at block 904, determines the objects (e.g., custom fields) which are being mapped in the recipe. For example, the method 900 may identify which custom fields are included in the requirements section of the recipe. The data for the custom fields may be stored in the requirements section associated with the 'copied' recipe.

At block 906, the method 900 retrieves the input schema and the output schema for the trigger and each of the actions in the recipe. In one approach, the input schema and the output schema may be retrieved by using the API provided by third-party applications to understand the schema. The schema may be computed by accessing the applications used within a recipe. As an illustration, the input schema and the output schema of the trigger and each of the actions may be retrieved via the API of a corresponding third-party software application, for example, using an introspection, e.g., metadata, API. If the API is not provided, the input schema and the output schema may be estimated (e.g., by data sampling). Specifically, the input schema and the output schema of the trigger and each of the actions may be calculated using a data sampling technique to approximate the schema. For instance, one or more objects, e.g. an invoice, may be retrieved. For each field within the object or sub-object, e.g. a customer field, the type of the field may be determined based on its format, e.g., string, number, date, time, or Boolean. For example, for a customer object having three rows of data, e.g. customers A, B, and C, the individual customer records may be examined to approximate the schema of the object. Additionally, the input schema and the output schema may be obtained by retrieving (e.g., from a third-party-affiliated application) and examining the documentation of the API which may provide a static definition of an object, for example, the documentation may describe how an object looks. The static definition may be included in the schema. Further, using the static schema obtained from the documentation, the schema may be augmented with dynamic introspection.

The following is an example function which fetches input and output schema from respective applications associated with a user account of a user:

```
//this function can also be explicitly called by user
schemaRefresh( )
{
    for each recipe step (i.e. actions and triggers)
        Fetch input and output schema from respective apps
}
```

At block 908, the method 900 creates a new instance of the recipe with updated input schema and updated output schema for the trigger and each of the actions in the recipe. As an illustration, the method 900 may recalculate and update the input and the output schema for each trigger and action using the retrieved input schema and output schema for the trigger and each of the actions in the recipe and schema from applications associated with the recipe copier's accounts. For example, the recipe may have a customized object. The method 900 may modify the input schema and the output schema of the recipe to reflect a schema of one or more of a third-party software application associated with the user account of the user. The input and output schemas of the new instance of the recipe, i.e. clone, are updated to reflect the customizations. Further, the method 900 may save the new instance of the recipe to memory, e.g. persistent non-transitory memory, in association with a user account of the user.

Figure 11:
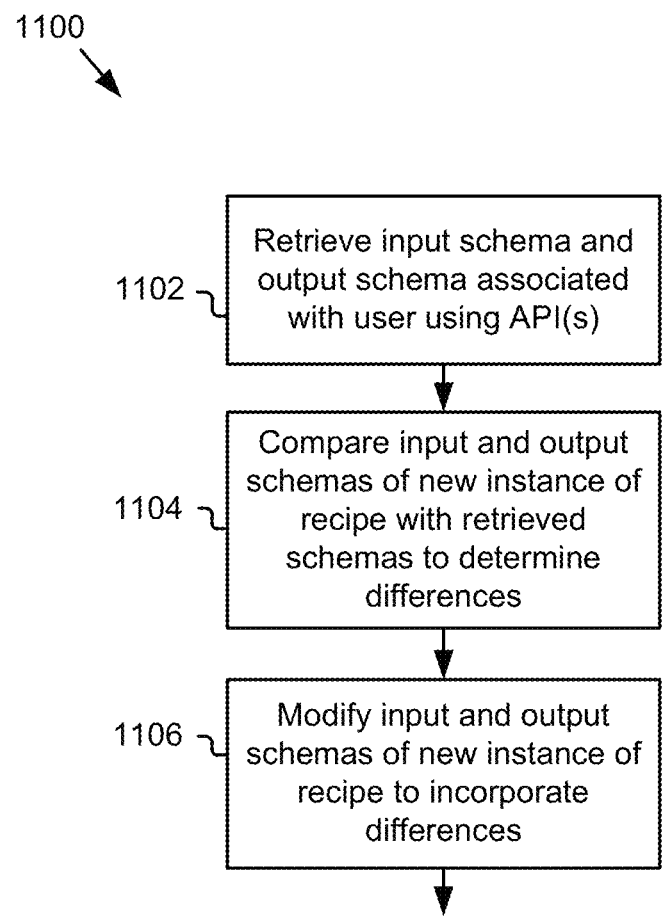
FIG. 11 is a flowchart depicting an example method for modifying the input schema and output schema for a cloned recipe.

FIG. 11 is a flowchart depicting an example method 1100 for modifying the input schema and output schema for a cloned recipe. At block 1102, the method 1100 retrieves the input schema and the output schema associated with the user using one or more APIs. For example, the system may determine third-party applications associated with the user's recipe and retrieve the schemas associated with that user's associated third-party applications using APIs. At block 1104, the method 1100 compares the input schema and the output schema of the new instance of the recipe with the retrieved schemas associated with the user to determine any differences. If differences are determined, at block 1106, the method 1100 modifies the input schema and the output schema of the new instance of the recipe to incorporate the differences.

Figure 10:
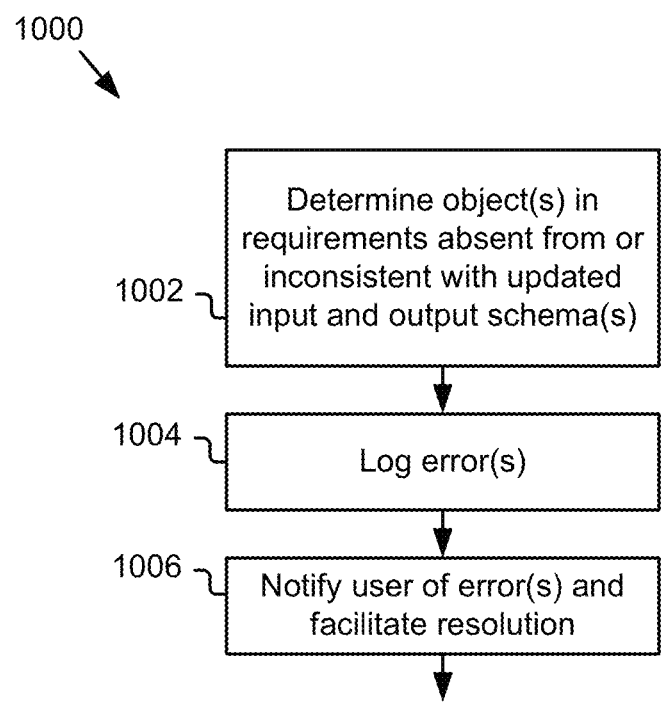
FIG. 10 is a flowchart depicting an example method for verifying whether computed requirements are satisfied by a new instance of recipe.

Returning to block 910, the method 900 verifies whether computed requirements are satisfied by the new instance of recipe. As an example, in FIG. 10 is a flowchart of one such example method. In this figure, the method 1000 verifies if the objects (e.g., custom fields) that are identified in the requirements are available as part of the schema changes. For example, at block 1002, the method 1000 may determine an object in the requirements section of the recipe is absent from or inconsistent with the updated input schema and updated output schema of one of the trigger and actions of the new instance of the recipe. An application-specific comparison operator may be used to perform the verification. For example, the following function calculates the difference between what is included in the requirements but not included in the updated schema:

```
calcRequirementErrors( )
{
    Find all the "outputs" of lines that are used in mappings
      (A)
    For each recipe line
    {
        do Requirements for extended output schema
        {
            Find all "outputs" from the requirements section
              for this
              line(B)
            Find all "outputs" from current extended output
              schema for
              this line(C)
            Generate an error for each output usage (A) which
              present in
              requirements for output (B) but not present in
              current extended
``` output schema (C). In set terms it is A ∩ (B-C) being non empty leads to errors.
}
do Requirements for extended input schema
{
   Find all "inputs" from the requirements section (D)
   Find all "inputs" from current extended input schema (E)
   Find all mapped input for this line (have some non-empty
   value) (F)
   Generate an error for each required input (from D) that
      is absent in current schema (E) and used (in F).
   Set
      logic: (D-E) ∩ F being non empty leads to errors.
   }
}
If the method 1000 determines missing or inconsistent objects, at block 1004, the method 1000 may log the error in storage, e.g. persistent non-transitory memory.
   errors=calcRequirementErrors( )
Further, at block 1006, the method 1000 may notify the user of the missing or inconsistent object (e.g., custom field, unpopulated field, unmapped field, etc.) and facilitate resolution of the error. As an illustration, the following function updates the requirements table to the new schema:
   // update requirements table to new schema
   updateRequirements( )
   {
      This is computed as the data fields in the extended input or output schema that is mapped but not available in current user's app schema
   }
The integration management system 100 is capable of sharing recipes because the system maintains the knowledge of what is customized by a first user. When a second user makes a copy of a recipe the method 900 goes through the list of customizations that have been implemented by the first user and then compares those customizations with the customizations that have been implemented by the second user. If the method 900 determines the customizations are the same those customizations will be used in the new instance of the recipe. If the method 900 determines the customizations are different, the system will point out the differences for the user. The method 900 may generate a user interface including a notification identifying the mapping error. The method 900 may further provide the user interface for presentation to the user. Upon notification, the user may choose to resolve the error by updating the schema of an application associated with their user account. For example, the user may add the missing custom fields to the application associated with their user account and refresh the schema in the recipe. Alternatively, the user may choose to edit or remove the inconsistent fields from the recipe. For example, the following functions depict an algorithm employed by the system to facilitate the user in resolving errors:
   // assuming no other errors
   while (requirementErrors==true)
   {
      user fixes errors
      saveRecipe( )
   }
   saveRecipe( )
   {
      optional schemaRefresh( )
      errors=calcRequirementErrors( )
      updateRequirements(errors)
   }
Upon resolution of the inconsistent or missing fields, the user may run the new instance of the recipe.
   // start recipe if no errors found (including requirements errors)
   startRecipe( );
Ability to bring external app content and functionality within SaaS apps Modern SaaS applications are often highly fragmented (a typical workplace function that requires automation often involves several applications to work in concert. For example, invoices may be generated in one application, but collections may happen in another. This makes for a sub-optimal UX experience as users have to log into multiple applications to get their work done. The integration management system 100 can render data and functionality in a context aware manner from other applications into a host application. The integration management system 100 can also render composite data derived from a set of applications in a similar manner.

There are two kinds of fragmentation issues associated with applications. In one case, there is a need to transform, map, and send data to other applications. In another case, even if a user is not moving data across applications as a business user, the user may want to look at multiple applications to pick up additional context about an object, e.g. a customer or an employee. There is a need for user interface integration, i.e., the ability to view data from one application within a user interface of a host application. Additionally, a user may desire the ability to trigger integrations from a user interface within a host application.

Figure 8:
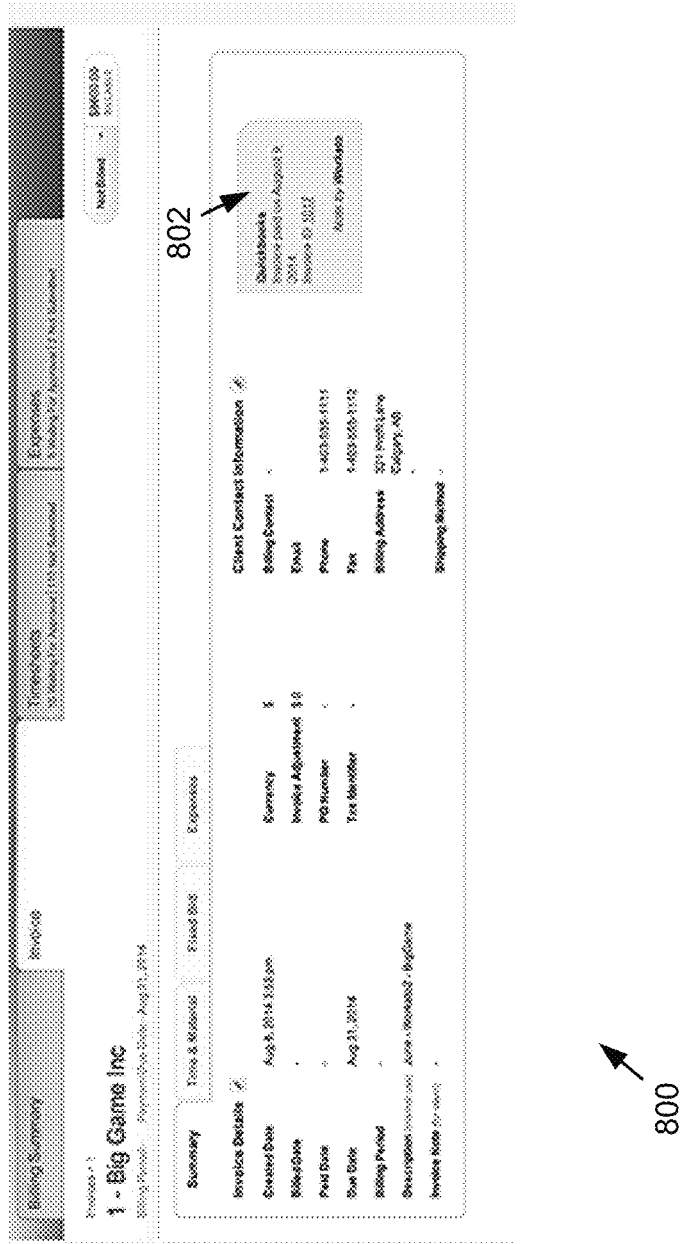
FIG. 8 is a graphical representation of an example graphical user interface of a host application that visually presents a sticky note within the GUI thereby providing additional context about what is displayed in the GUI.

One solution involves creating the ability to view data from a variety of different applications in a single place, i.e. a host application. The integration management system 100 may be able to render a sticky note allowing a window into different applications while currently in the host application. The sticky note implementation allows the rendering of foreign data in a visually rich and context sensitive manner. The system 100 may perform the integration using custom fields. For example, while a user is within the host application, a sticky note may be rendered on the GUI of the host application facilitating display of views into data from other applications. As an illustration, when viewing an object of an employee in Zendesk™, the user desires to see more information about the employee, data may be pulled and rendered from an Human Resource application, e.g. BambooHR™, within the Zendesk™ application. Further, the system 100 may render a series of sticky notes on the GUI of the host that together give the user a dashboard of the views needed across other applications. FIG. 8 depicts an example graphical user interface 800 of a host application that visually presents a sticky note 802 within the GUI thereby providing additional context about what is displayed in the GUI. For example, interface 800 displays an invoice for a payment due on a bill. The sticky note 802 rendered within the GUI of the host app displays contextual data retrieved from QuickBooks™, namely, confirmation the invoice was paid.

Partner Integrations

Integration management system 100 includes an integration engine 140 that is configured to allow partners to manage and monitor integrations for their customers. In an example, a partner may be a SaaS vendor, and the end user may be a user of the SaaS vendor's software platform.

In some embodiments, the integration engine 140 provides partners with the ability to create their own application exchange platform. While, larger SaaS companies may provide app platforms that enable their partners and third-parties to create value added applications on top of their product (e.g., Salesforce.com's Appexchange and Intuit's app marketplace), developing such an application platform is challenging as it requires technical sophistication as well as the marketing capability to attract partners and third-parties to develop on the platform. As a result most smaller SaaS vendors are unable to develop such an ecosystem and are at a disadvantage compared to their larger SaaS competitors. Additionally, existing application exchanges and marketplaces have significant limitations. They are mostly places for partners to advertise their applications and provide pointers to connector apps that link the partner applications with the home app of the application exchange or marketplace in question. Customers of the partner applications are generally required to go out of the context of the partner applications and go to the marketplaces to obtain separate connectors which they then independently have to setup and use.

Figure 22:
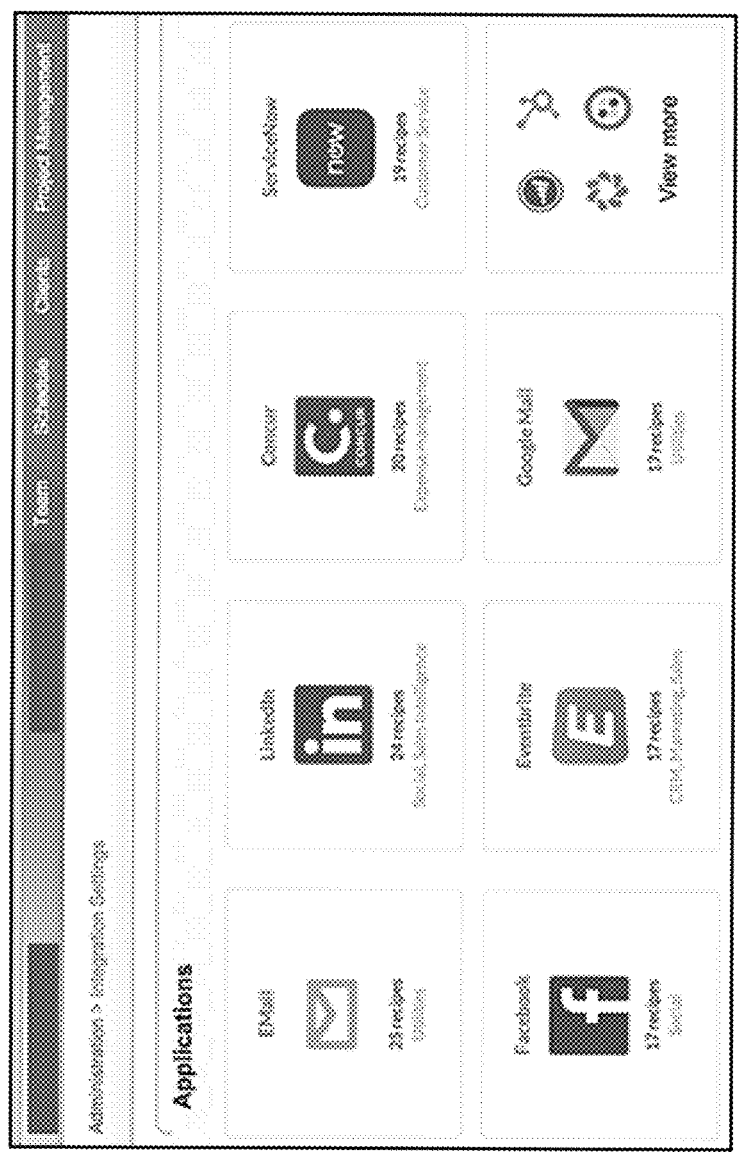
FIG. 22 is a graphical representation of an example interface displaying details about available applications and the number of recipes associated with each application.

The embedded solution provided by the integration engine 140 enables SaaS vendors of any size to setup and provide their own application platform without having to invest heavily in development. By embedding the appropriate integration engine 140 widget into their application, SaaS vendors of any size can have their own application platform, an example of which is depicted in FIG. 22. Additionally, the connectors powering the application platform are available within the partner application, so the user experience appears seamless.

The integration engine 140 yields a number of further advantages including reducing the requirements (IT, hardware, software) for end users to design and operate application(s), offers pre-built recipes and adapters for a large number of scenarios, provides robust functionality, such as nested data, arrays, mappings, etc., requires minimal time to embed and style, and allows UX consistency with the partner's product, provides a simple partnership model, and provides a reliable end-user support solution.

When boarding a new partner, the partner (also interchangeably referred to as a vendor), is authorized with the integration engine 140 using a single sign-on protocol (SSO). Under this approach, the vendor to embeds widget code generated and provided by the integration engine 140 into the interface code of their software service and add server side code configured to generate a signed and encrypted session_id. The integration engine 140, in cooperation with the client application 108, generates and presents an admin interface via which a partner user can configure SSO. The admin interface displays the value for the vendor/partner_id and a field for the partner user to input the public_key of the integration management system 100.

When authenticating with SSO, the vendor's third-party application 160 constructs a hash. In some embodiments, the hash may be constructed using the user_id (id of the user in vendor's system), email (email_id of the user in vendor's system), first_name, last_name, valid_from (UNIX time stamp), and valid_till (UNIX time stamp). Next, the application 160 serializes the hash using a certain format (e.g., to JSON) and signs the string using the vendor's private_key. The application 160 then encrypts the signed data using the public_key. This value is the session_id.

Next, the vendor's third-party application 160 constructs the URL for the interface element (e.g., IFRAME) with the session_id and the vendor/partner_id. Upon receiving the interface element (e.g., IFRAME) URL request, the integration engine 140 decrypts the session_id using the private_key of the integration management system 100 and decodes the signed session information using vendor's public_key. Next, the integration engine 140 validates the time window and performs a lookup for user using the app_id and vendor's user_id. If the user doesn't exist, the integration engine 140 creates the user account and declares authentication success or failure as applicable.

In another SSO embodiment, the vendor embeds the provided widget code as described above, but selects a "simple" SSO option in the admin interface and applies the corresponding provided code (e.g., JavaScript) to vendor's site. In this embodiment, during the session_id generation, the signing step may be skipped.

It should be understood that in other embodiments, other suitable SSO methods may be used, such as SAML, Okta, OneLogin, Ping Identity, etc.

Provisioning and Ongoing Maintenance of Integration

Via the admin interface associated with the integration engine 140, a partner account (e.g., enterprise account which allows for the creation of sub accounts for partner employees) is registered for a given partner, and then various recipes are identified and made available to the partner's customers (e.g., by category, type, etc.). Appropriate SSO options are also configured based on the partner's requirements (e.g., API key, PGP, etc.). The integration engine 140 also provides the embed code (e.g., JavaScript) for the partner's integration widget. In some instances, these configurations are performed by an employee or other stakeholder associated with the integration management system 100, although other variations are also possible.

Next, the partner adds the embed code to the administrator interface (e.g., the bottom of an admin settings page) and includes a container in the interface to host/contain the integration widget.

In some embodiments involving QuickBooks™ Online (QBO), the partner may then introduce a new state to the invoice object (to submit for billing), and perform further (and in some cases optional) steps depending on the user or event-driven integration. For instance, the partner may add a button to an invoice details interface for submitting the invoice to QBO, add code to change the state of the invoice to 'Submitted to QBO' upon select of the button, etc.

In some embodiments involving a social network, a partner-user may select via an interface, an integration recipe to use, provide authentication credentials to connect to the 3rd party system(s), provide configuration parameters to run the recipe, turn the recipes ON/OFF, and monitor failed invocations. Graphical representations of example interfaces for performing these functions are depicted in FIGS. 15-21. In some embodiments, these actions may be performed using an interface backed by the integration engine 140 or the partner's third-party application 160.

Figure 23:
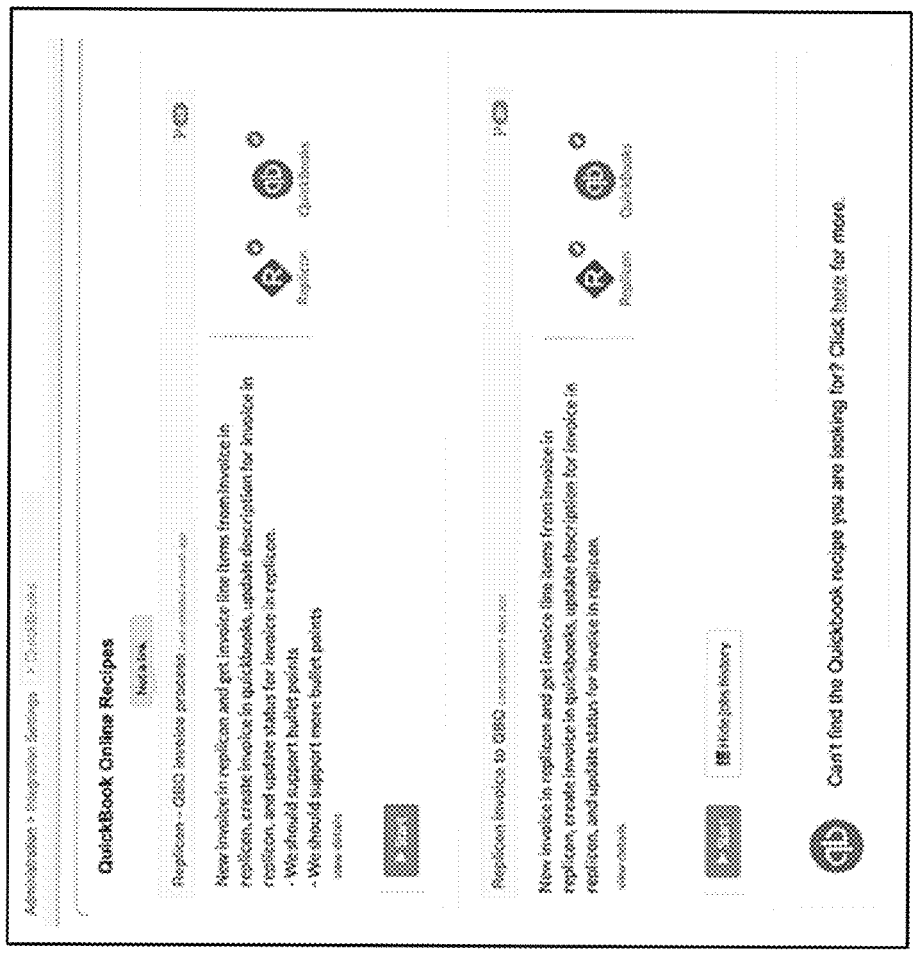
FIG. 23 is a graphical representation of an example interface presenting the recipes associated with an application.
Figure 24:
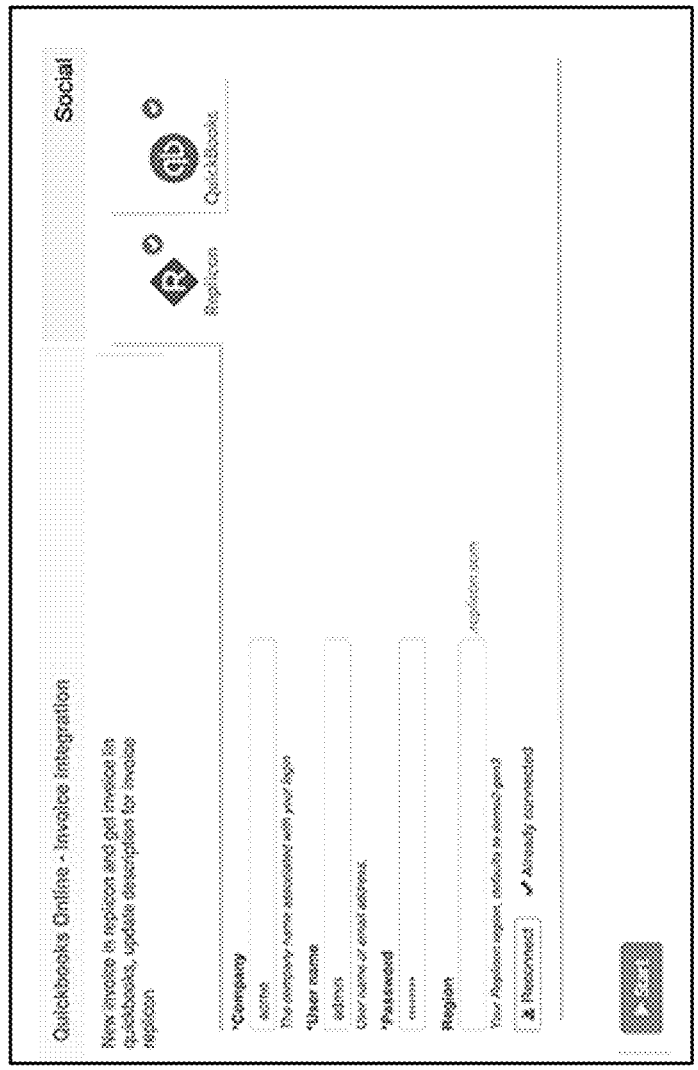
FIG. 24 is a graphical representation of an example interface allowing a user to sign in to connect to an application.

An end user of the partner's SaaS platform may, using an associated interface, utilize the functions of the integrated application. For example, in an embodiment involving a QBO invoice, the user may change state (to submit for billing) or select a button configured to submit the invoice to QBO in an invoice details screen. Responsive to the selection, and the generation and submission of a corresponding request to the integration management system 100, the integration engine 140 receives and then posts the invoice to QBO, and updates the state of the invoice to 'Submitted to QBO—Success'. Advantageously, to the end user, the integration between QBO and the partner's site is transparent. Graphical representations of various example interfaces for starting and configuring the integrated QBO applications/recipes are depicted in FIGS. 23 and 24.

In some embodiments, the following process is used to provision partner settings for an integration engine 140 account of a partner end-user. The integration widget URL contains a session_id and partner_id parameters. The session_id contains name and the partner_customer_id of the customer. When the integration frame is loaded in the partner's customer admin account, the integration engine 140 checks to see if the account exists. If not, the integration engine 140 creates the account under the partner and credentials to connect to partner's customer account are generated.

A partner administration account may include a number of privileges, such as creating and managing recipes, creating and managing users and roles, managing passwords, managing accounts (add/enable/disable/etc.), traversing accounts (list/search/sort/filter/etc.), adding or removing user roles, listing users in a given role, enabling SSO access, setting access control rules for recipes, etc.

In some embodiments, the set of customizable fields in a recipe is configurable without having to 'open' the recipe in the interface.

For a given integration, a partner may create a new tab. This tab/page embeds the integration engine 140 via a container element (e.g., IFRAME), which can be styled by partner to have the same look and feel as the rest of partner's web site. In some embodiments, the interface can selectively display the tab based on the role of logged in user. In some embodiments, the integration engine 140 requests the user's partner account credentials (API key, etc.). In further embodiments where the partner supports OAuth, the integration engine 140 may request account credentials on-demand (e.g., when user decides to run a recipe) and may only ask for the credentials once and save the authentication information for later requests.

The integration tab can feature content from partner as well as the integration engine 140. Each partner has a partner account registered with the integration engine 140 that enables the partner to control the content presented in the container (e.g., IFRAME) (e.g., what recipes to display). Typically, this page may display available recipes, active recipes, and inactive recipes, recipe curation, configuration, editing, and execution options, debugging options, etc., which is similar to the native experience of the integration management system 100 discussed elsewhere in this document.

While certain acts and/or functionality described herein as being associated with certain modules, it should be understood that these acts and/or functionality may be performed by other modules, or a combination of two or more modules, and/or moved from a client side or server side implementation without departing from the scope of this disclosure. Additionally, it should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into to a single computing device or system or additional computing devices or systems, etc. In addition, while the system 100 depicted in FIG. 1 provides an example of an applicable computing architecture, it should be understood that any suitable computing architecture, whether local, distributed, or both, may be utilized in the system 100.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware Implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 202.

Wireless (e.g., Wi-Fi™)transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for cloning software recipes, comprising:
   receiving a software recipe clone request from a user device to clone a software recipe, the software recipe comprising code including an integration flow for integrating specific software applications, the integration flow including a trigger and one or more actions executable via one or more network-accessible third-party software applications, each of the one or more actions executable using a method accessible via an application programming interface (API) of a corresponding third-party software application;
   responsive to receiving the software recipe clone request, computing requirements of the software recipe;
   retrieving input schema and output schema for the trigger and each of the one or more actions, the input schema and the output schema associated with a first instance of the specific software applications, the input schema and the output schema being specific to a first user, the software recipe being cloned from an account associated with the first user;
   generating an updated input schema and an updated output schema for the trigger and each of the one or more actions for a new instance of the software recipe based on the retrieved input schema and output schema and a second instance of the specific software applications that is specific to a user account of a second user;
   saving the new instance of the software recipe with the updated input schema and the updated output schema for the trigger and each of the one or more actions to persistent non-transitory memory in association with the user account of the second user; and
   verifying whether the computed requirements are satisfied by the new instance of the software recipe, wherein the verifying comprises:

determining an object in the requirements of the software recipe absent from or inconsistent with the updated input schema and the updated output schema of one of the trigger and the one or more actions of the new instance of the software recipe, and logging a mapping error in the persistent non-transitory memory responsive to the determination.

2. The method of claim 1, wherein computing requirements of the software recipe comprises identifying an object used for integration of the first instance of the specific software applications included in the requirements of the software recipe.

3. The method of claim 1, wherein the input schema and the output schema of the trigger and each of the one or more actions are retrieved via the API of the corresponding third-party software application.

4. The method of claim 1, wherein generating the updated input schema and the updated output schema comprises modifying the input schema and output schema of the software recipe to reflect a schema a third-party software application associated with the user account of the second user.

5. The method of claim 1, further generating a user interface including a notification identifying the mapping error and providing the user interface for presentation.

6. The method of claim 5, further comprising adding one or more missing objects to the updated input schema and the updated output schema.

7. A computer-implemented method for cloning software recipes, comprising:

receiving a software recipe clone request from a user device to clone a software recipe, the software recipe comprising code including an integration flow for integrating specific software applications, the integration flow including a trigger and one or more actions executable via one or more network-accessible third-party software applications, each of the one or more actions executable using a method accessible via an application programming interface (API) of a corresponding third-party software application;

responsive to receiving the software recipe clone request, computing requirements of the software recipe including identifying an object used for integration of the first instance of the specific software applications;

retrieving input schema and output schema for the trigger and each of the one or more actions, the input schema and the output schema associated with a first instance of the specific software applications, the input schema and the output schema being specific to a first user, the software recipe being cloned from an account associated with the first user;

generating an updated input schema and an updated output schema for the trigger and each of the one or more actions for a new instance of the software recipe based on the retrieved input schema and output schema and a second instance of the specific software applications that is specific to a user account of a second user;

saving the new instance of the software recipe with the updated input schema and the updated output schema for the trigger and each of the one or more actions to persistent non-transitory memory in association with the user account of the second user; and verifying whether the computed requirements are satisfied by the new instance of the software recipe based on the object included in the requirements.

8. The method of claim 7, wherein the input schema and the output schema of the trigger and each of the one or more actions are retrieved via the API of the corresponding third-party software application.

9. The method of claim 7, wherein the input schema and the output schema of the trigger and each of the one or more actions are calculated using data sampling.

10. The method of claim 7, wherein verifying whether the computed requirements are satisfied comprises:

determining the object in the requirements of the software recipe absent from or inconsistent with the updated input schema and the updated output schema of one of the trigger and the one or more actions of the new instance of the software recipe, and logging a mapping error in the persistent non-transitory memory responsive to the determination.

11. The method of claim 10, further generating a user interface including a notification identifying the mapping error and providing the user interface for presentation.

12. The method of claim 7, wherein generating the updated input schema and the updated output schema comprises modifying the input schema and output schema of the software recipe to reflect a schema of a third-party software application associated with the user account of the second user.

13. The method of claim 11, further comprising adding one or more missing objects to the updated input schema and the updated output schema.

14. A system comprising:

one or more processors; and a memory storing instructions that, when executed, cause the one or more processors to:

receive a software recipe clone request from a user device to clone a software recipe, the software recipe comprising code including an integration flow for integrating specific software applications, the integration flow including a trigger and one or more actions executable via one or more network-accessible third-party software applications, each of the one or more actions executable using a method accessible via an application programming interface (API) of a corresponding third-party software application;

responsive to receiving the software recipe clone request, compute requirements of the software recipe;

retrieve input schema and output schema for the trigger and each of the one or more actions, the input schema and the output schema associated with a first instance of the specific software applications, the input schema and the output schema being specific to a first user, the software recipe being cloned from an account associated with the first user;

generate an updated input schema and an updated output schema for the trigger and each of the one or more actions for a new instance of the software recipe based on the retrieved input schema and output schema and a second instance of the specific software applications that is specific to a user account of a second user;

save the new instance of the software recipe with the updated input schema and the updated output schema for the trigger and each of the one or more actions to persistent non-transitory memory in association with the user account of the second user; and verify whether the computed requirements are satisfied by the new instance of the software recipe.

15. The system of claim 14, wherein to compute requirements of the software recipe the instructions cause the one or more processors to identify an object used for integration of the first instance of the specific software applications included in the requirements of the software recipe.

16. The system of claim 14, wherein to retrieve the input schema and the output schema the instructions cause the one or more processors to compute the input schema and the output schema via one of the API of the corresponding third-party software application and data sampling.

17. The system of claim 14, wherein to verify whether the computed requirements are satisfied the instructions cause the one or more processors to:
- determine an object in the requirements of the software recipe absent from or inconsistent with the updated input schema and the updated output schema of one of the trigger and the one or more actions of the new instance of the software recipe;
- log a mapping error in the persistent non-transitory memory responsive to the determination; and
- add one or more missing objects to the updated input schema and the updated output schema.

18. The system of claim 17, wherein the instructions further cause the one or more processors to generate a user interface including a notification identifying the mapping error and providing the user interface for presentation.

19. The system of claim 14, wherein to generate the updated input schema and the updated output schema the instructions cause the one or more processors to modify the input schema and output schema of the software recipe to reflect a schema of a third-party software application associated with the user account of the second user.

* * * * *